(12) United States Patent
Choi et al.

(10) Patent No.: US 11,757,140 B2
(45) Date of Patent: Sep. 12, 2023

(54) AQUEOUS ENERGY STORAGE SYSTEMS WITH DESALINATION CAPABILITIES

(71) Applicant: Wisconsin Alumni Research Foundation, Madison, WI (US)

(72) Inventors: Kyoung-Shin Choi, Fitchburg, WI (US); Dohwan Nam, Madison, WI (US); Margaret Lumley, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 226 days.

(21) Appl. No.: 17/165,081

(22) Filed: Feb. 2, 2021

(65) Prior Publication Data

US 2022/0246998 A1    Aug. 4, 2022

(51) Int. Cl.
    *H01M 10/44*     (2006.01)
    *H01M 10/36*     (2010.01)
         (Continued)

(52) U.S. Cl.
    CPC ............. *H01M 10/44* (2013.01); *H01M 4/38* (2013.01); *H01M 4/5825* (2013.01);
         (Continued)

(58) Field of Classification Search
    CPC ....... H01M 10/36; H01M 10/42–4214; H01M 10/44; H01M 12/00–04; H01M 50/70;
         (Continued)

(56) References Cited

U.S. PATENT DOCUMENTS

| 8,889,281 B2 | 11/2014 | La Mantia et al. |
| 10,414,674 B2 | 9/2019 | Choi et al. |

(Continued)

FOREIGN PATENT DOCUMENTS

| KR | 20200104982 A | * 9/2020 | ............. C02F 1/469 |
| KR | 10-2020-0133053 A | 11/2020 | |

(Continued)

OTHER PUBLICATIONS

Machine translation of Kim (KR 10-2020-0104982). Originally available Sep. 7, 2020 (Year: 2020).*

(Continued)

*Primary Examiner* — Jonathan Crepeau
*Assistant Examiner* — Jacob Buchanan
(74) *Attorney, Agent, or Firm* — BELL & MANNING, LLC

(57) ABSTRACT

Dual-functional energy storage systems that couple ion extraction and recovery with energy storage and release are provided. The dual-functional energy storage systems use ion-extraction and ion-recovery as charging processes. As the energy used for the ion extraction and ion recovery processes is not consumed, but rather stored in the system through the charging process, and the majority of the energy stored during charging can be recovered during discharging, the dual-functional energy storage systems perform useful functions, such as solution desalination or lithium-ion recovery with a minimal energy input, while storing and releasing energy like a conventional energy storage system.

9 Claims, 14 Drawing Sheets

(51) Int. Cl.
  *H01M 8/18* (2006.01)
  *H01M 10/42* (2006.01)
  *H01M 10/054* (2010.01)
  *H01M 4/38* (2006.01)
  *H01M 4/58* (2010.01)

(52) U.S. Cl.
  CPC ......... *H01M 8/184* (2013.01); *H01M 10/054* (2013.01); *H01M 10/36* (2013.01); *H01M 10/4214* (2013.01); *H01M 2300/0002* (2013.01)

(58) Field of Classification Search
  CPC ...... H01M 4/36; H01M 4/38; H01M 6/30–34; H01M 8/18; H01M 8/184–188; H01M 8/22; H01M 8/227; H01G 9/022; H01G 9/035; H01G 11/00–02; H01G 11/58; H01G 11/62; C02F 1/26–265; C02F 1/46; C02F 1/4604; C02F 1/4608–46109; C02F 2001/46123
  See application file for complete search history.

(56) References Cited

U.S. PATENT DOCUMENTS

| | | | |
|---|---|---|---|
| 2007/0000774 A1 | 1/2007 | Weres | |
| 2009/0211918 A1* | 8/2009 | Hardee | C25B 15/00 |
| | | | 205/628 |
| 2012/0135282 A1* | 5/2012 | La Mantia | H01M 6/34 |
| | | | 429/70 |
| 2018/0201524 A1* | 7/2018 | Choi | H01M 4/5825 |
| 2019/0047880 A1 | 2/2019 | Desai et al. | |

FOREIGN PATENT DOCUMENTS

| | | | | |
|---|---|---|---|---|
| WO | WO-2018132072 A1 * | 7/2018 | ............. | C02F 1/469 |
| WO | WO-2019241917 A1 * | 12/2019 | ............. | H01G 11/06 |

OTHER PUBLICATIONS

Kim et al., Low Energy Desalination Using Battery Electrode Deionization. Published in : Environmental Science & Technology Letters 2017. Sep. 21, 2017, vol. 4, No. 10, pp. 444-449.

International Search Report and Written Opinion issued on PCT/US2022/011570, dated May 2, 2022, pp. 1-10.

Bin et al., "Progress in Aqueous Rechargeable Sodium-Ion Batteries," Advanced Energy Materials, 2018, 8, 1703008, 31 pages.

Kim et al. "Aqueous Rechargeable Li and Na Ion Batteries," *Chem. Rev.* 2014, 114, 11788-11827.

Kundu et al., "The Emerging Chemistry of Sodium Ion Batteries for Electrochemical Energy Storage," *Angew. Chem. Int. Ed.* 2015, 54, 3431-3448.

Shin et al, "Opportunities and Reality of Aqueous Rechargeable Batteries," Advanced Energy Materials, 2020, 10, 2001386, 10 pages.

Vaalma et al., "A cost and resource analysis of sodium-ion batteries," Nature Reviews, vol. 3, Article No. 18013, 2018.

Zavahir et al., "A review on lithium recovery using electrochemical capturing systems," *Desalination* 500 (2021) 114883, 31 pages.

Gao et al., "VOCl as Cathode for Rechargeable Chloride Ion Batteries," Angewandte Chemi, vol. 128, Issue 13, pp. 4357-4362, Feb. 29, 2016.

Pasta et al., "A Desalination Battery," *Nano Lett.* 2012, 12, 839-843.

Lu et al., "A review on the key issues for lithium-ion battery management in electric vehicles," *Journal of Power Sources* 226 (2013) 272-288.

* cited by examiner

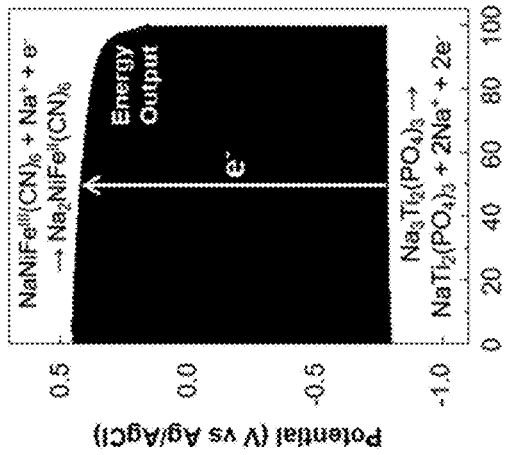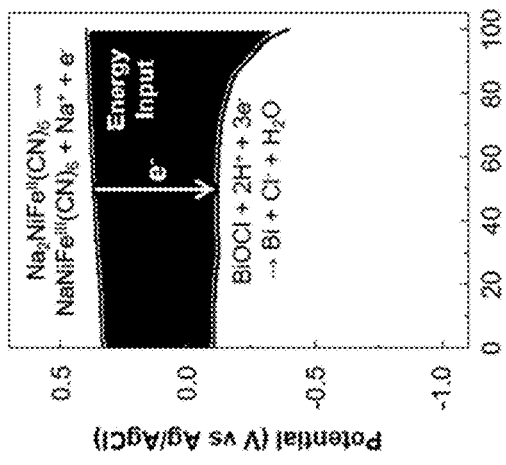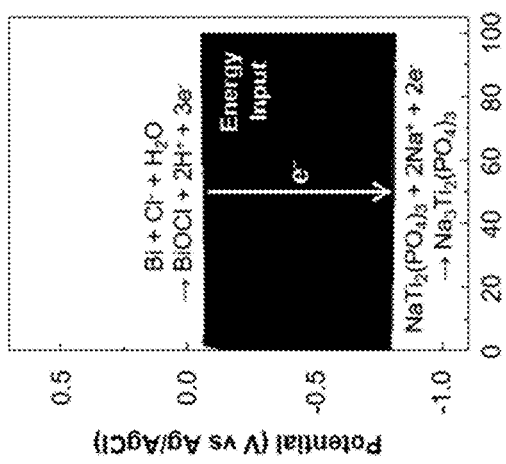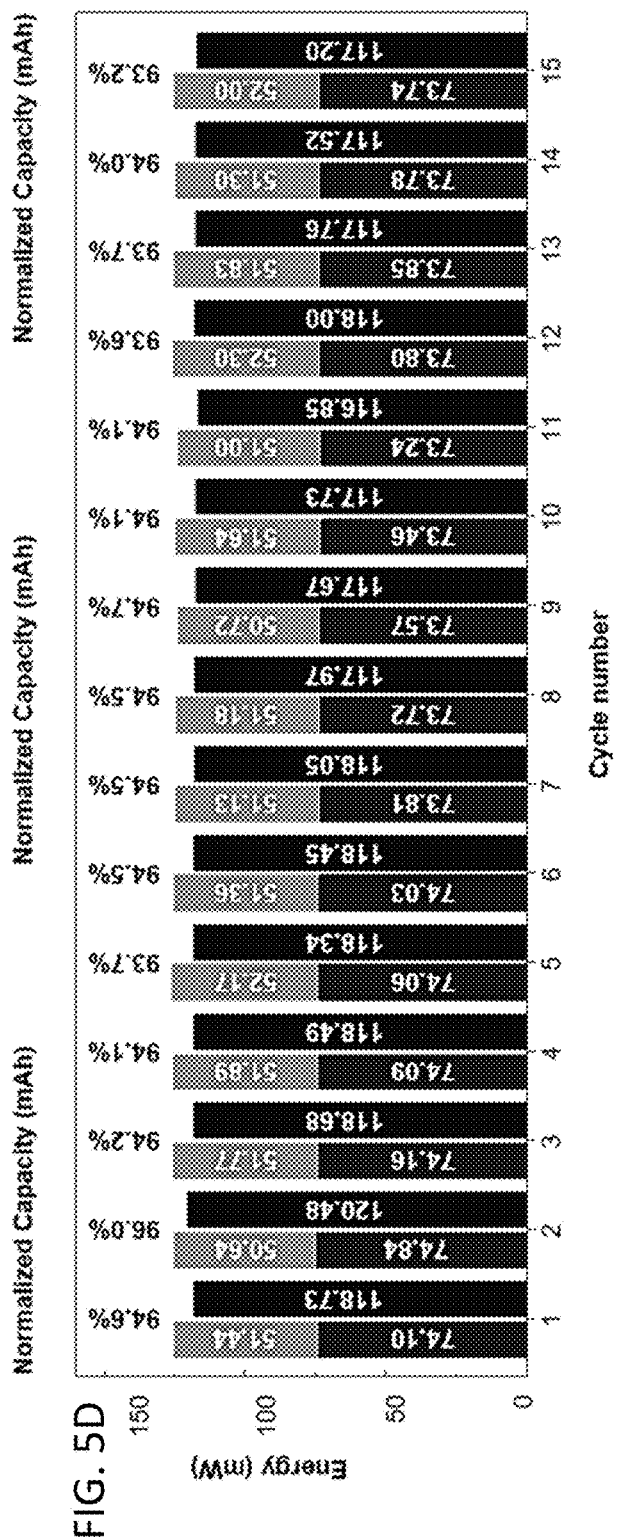

AQUEOUS ENERGY STORAGE SYSTEMS WITH DESALINATION CAPABILITIES

REFERENCE TO GOVERNMENT RIGHTS

This invention was made with government support under CBET-1803496 awarded by the National Science Foundation. The government has certain rights in the invention.

BACKGROUND

Concerns about the negative environmental impacts of fossil fuels and an increase in global energy demands have inspired the development of technologies that utilize renewable energy sources such as solar, wind, and tidal to produce green electricity. However, the intermittent nature of renewable energy sources necessitates integration of these technologies with energy storage systems (ESSs). ESSs can store electricity during times of excess electricity production and can then release that electricity in times of high energy demand. Integration of renewable energy technologies and ESSs allows for the development of a robust and reliable electricity system.

Li-ion batteries (LIBs) are presently one of the most advanced technologies for ESSs due to their high energy density, long cycle life, and excellent energy efficiency. However, the high cost, performance reliability, and safety of LIBs are challenges that still need to be addressed for LIBs to be used in large-scale ESSs. Aqueous rechargeable Na-ion batteries (ARNBs) have emerged as a promising alternative energy storage solution. In general, Na-ion batteries are less expensive than Li-ion batteries, and the use of an aqueous electrolyte eliminates various issues caused by the use of non-aqueous electrolytes in LIBs; aqueous electrolytes are safer, cheaper, and more environmentally benign than non-aqueous electrolytes. One disadvantage of ARNBs is their relatively low cell voltages that are inevitably restricted by the reduction and oxidation potentials of water present in the electrolyte. However, if the advantages offered by ARNBs can be practically realized at a large scale, the advantages of ARNBs may outweigh this limitation to make ARNBs a viable candidate for ESSs.

Another type of rechargeable battery that can operate in an inexpensive aqueous electrolyte, such as seawater, is a desalination battery. Desalination batteries are rechargeable batteries that combine a sodium ($Na^+$) storage electrode and a chloride ($Cl^-$) storage electrode. The charging and discharging processes in desalination batteries are coupled with the removal and release of $Na^+$ and $Cl^-$. The output voltage generated by desalination batteries during discharging is typically even lower than that of ARNBs. This is because the chlorination potential of the chloride storage electrode typically lies between the sodiation potentials of the two sodium storage electrodes chosen to maximize the output voltage of ARNBs. The low output voltage is not a problem for desalination batteries because the primary purpose of desalination batteries is not to maximize the output voltage, but to achieve desalination with a minimum energy input. However, the low output voltage prevents the use of desalination batteries as efficient ESSs.

SUMMARY

Methods and dual-functions ESSs that couple ion extraction and recovery with energy storage and release using an aqueous solution of sodium and/or lithium and chloride ions are provided.

One embodiment of a method that couples the ion extraction and recovery with energy storage and release using an aqueous solution comprising sodium ions or lithium ions and chloride ions includes the steps of: (a) charging a first electrochemical cell comprising: the aqueous electrolyte solution; a chloride storage anode comprising a dechlorinated chloride storage material; and a sodium storage cathode comprising a first desodiated sodium storage material or a lithium storage cathode comprising a first delithiated lithium storage material, wherein the charging results in the removal of the chloride ions and the sodium ions or lithium ions from the aqueous solution, the conversion of the dechlorinated chloride storage material into a chlorinated chloride storage material, and the conversion of the first desodiated sodium storage material into a first sodiated sodium storage material or the conversion of the first delithiated lithium storage material into a first lithiated lithium storage material; (b) charging a second electrochemical cell comprising: an ion-recovery electrolyte solution; a sodium storage anode comprising a second sodiated sodium storage material or a lithium storage anode comprising a second lithiated lithium storage material; and a chlorinated chloride storage cathode comprising the chlorinated chloride storage material, wherein the charging results in the release of chloride ions and sodium ions or lithium ions into the aqueous solution, the conversion of the chlorinated chloride storage material into the dechlorinated chloride storage material, and the conversion of the second sodiated sodium storage material into a second desodiated sodium storage material or the conversion of the second lithiated lithium storage material into a second delithiated lithium storage material; and (c) discharging a discharging electrochemical cell comprising: a discharging electrolyte solution; a sodium storage anode comprising the first sodiated sodium storage material or a lithium storage anode comprising the first lithiated lithium storage material; and a sodium storage cathode comprising the second sodium storage electrode comprising the second desodiated sodium storage material or the second lithium storage electrode comprising the second delithiated lithium storage material, wherein the discharging generates an output voltage.

One embodiment of a dual-functional ESS includes: a chloride storage electrode comprising a dechlorinated or chlorinated chloride storage material; a first sodium storage electrode comprising a first desodiated or sodiated sodium storage material, or a first lithium storage electrode comprising a first delithiated or lithiated lithium storage material; a second sodium storage electrode comprising a second sodiated or desodiated sodium storage material, or a second lithium storage electrode comprising a second lithiated or delithiated lithium storage material; one or more cell compartments in which the chloride storage electrode, the first sodium storage electrode, and the second sodium storage electrode are contained; and an external circuit connecting at least two of the chloride storage electrode, the first sodium storage electrode, and the second sodium storage electrode.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIGS. 5A-5C show potential-capacity plots obtained at 1.33 mA $cm^{-2}$ for (FIG. 5A) Charging Cell 1 (the $Bi/NaTi_2(PO_4)_3$ cell) in 0.6 M NaCl, (FIG. 5B) Charging Cell 2 (the NiHCF/Bi cell) in 70 mM HCl (pH 1.3), and (FIG. 5C) Discharging Cell (the $NiHCF/NaTi_2(PO_4)_3$ cell) in 0.6 M NaCl. (The capacities of all three cells were normalized to be 100 mAh.) The individual potentials of the electrodes were measured against an Ag/AgCl RE. FIG. 5D shows the energy inputs required for Charging Cell 1 (dark grey) and Charging Cell 2 (light grey), the energy output generated by Discharging Cell (black), and the energy efficiency obtained for 15 cycles.

DETAILED DESCRIPTION

Dual-function ESSs that couple the desalination and salination of aqueous solutions with power generation are provided. By coupling these functions in a single system, the advantages offered by ARNBs can be practically realized at a large scale, and the drawback of the low output voltage of desalination batteries can be overcome to produce an efficient and cost-effective ESS that is capable of seawater desalination.

Figure 1A:
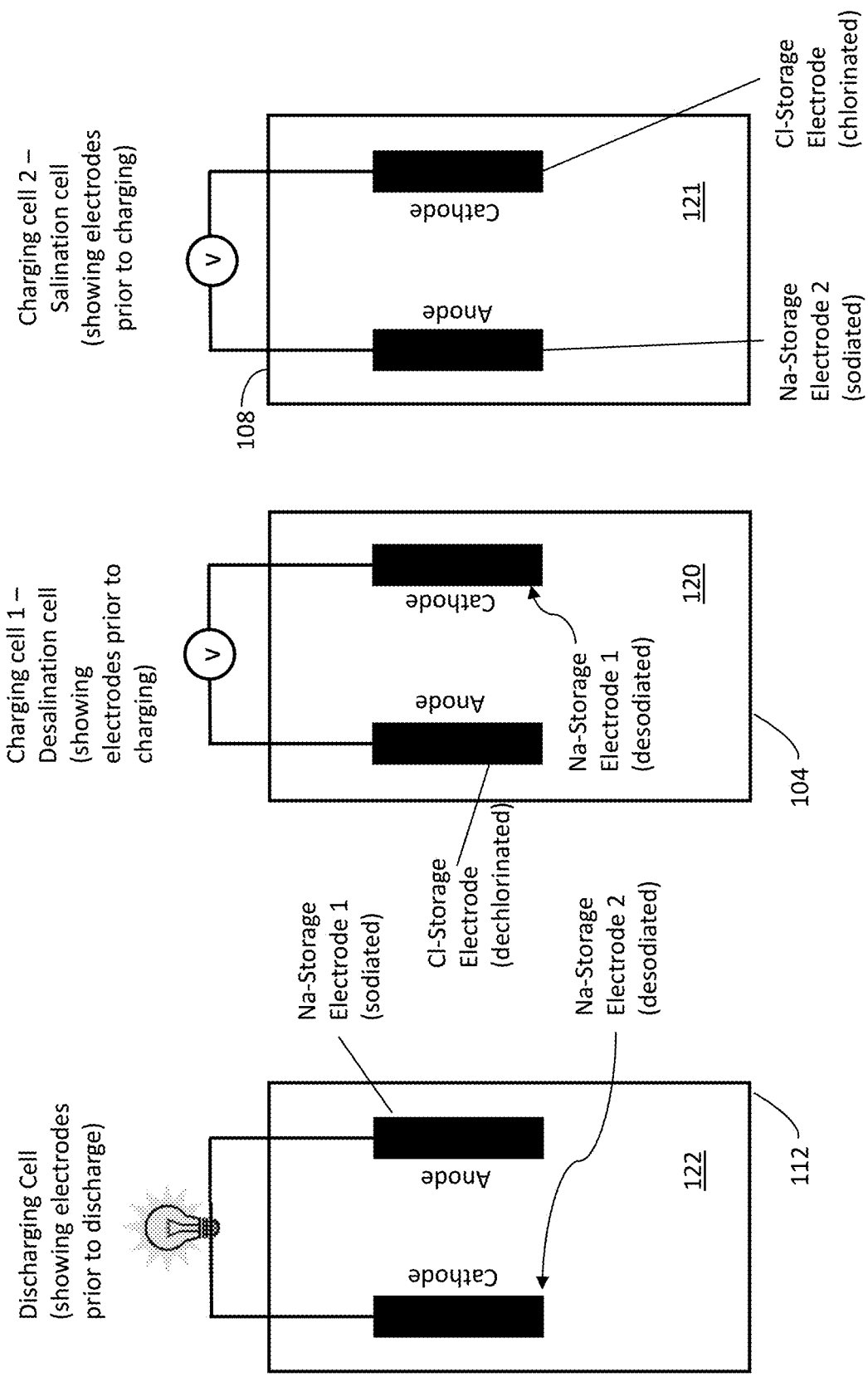
FIG. 1A is a schematic diagram of the electrode configurations for the desalination (middle panel), salination (right panel), and discharging stages (left panel) of one embodiment of a dual-function ESS.

In the dual-function ESSs, power generation is provided by a discharging process that uses two sodium storage (Na-storage) electrodes, one with a more negative sodiation potential than the other. In order to maximize the voltage output, the sodiation potential of the first Na-storage electrode ("Na-storage electrode 1") should be closer to the water reduction potential and the sodiation potential of the second Na-storage electrode ("Na-storage electrode 2") should be closer to the water oxidation potential. A discharging cell 112 showing the electrode set-up prior to discharging is shown in FIG. 1A, left panel. Prior to discharging Na-storage electrode 1 is sodiated and Na-storage electrode 2 is desodiated. During discharging, sodium ions move from sodiated Na-storage electrode 1 (the anode), through an electrolye solution 122, to desodiated Na-storage electrode 2 (the cathode). As a result of the discharging process, Na-storage electrode 1 becomes desodiated and Na-storage electrode 2 becomes sodiated.

Electrolyte solutions that can be used for the discharging process are not particularly limited and can include a variety of ions. The electrolyte solutions may be acidic, neutral, or basic aqueous solutions, depending on the optimal operating conditions for the chosen electrodes. The electrolyte solution used during discharging can be referred to as a discharging electrolyte solution. Aqueous solutions that can be used as a discharging electrolyte solution include saline water containing dissolved sodium and chloride ions from a natural body of water, such as seawater, water from a salt lake, or brackish water. However, other solutions containing sodium and chloride ions can be used, including geothermal brines and wastewater solutions from industrial processes.

The discharging process of the ESSs is analogous to that used in a conventional ARNB. However, the charging process for the ESSs differs significantly from that of a conventional ARNB. In a conventional ARNB, charging and discharging use the same electrodes; during charging, the flow of ions is reversed with Na ions moving from sodiated Na-storage electrode 2 to desodiated Na-storage electrode 1. In contrast, unlike a conventional ARNB, the charging process in the ESSs described herein use a two-step charging process that employs a chloride storage (Cl-storage) electrode, as illustrated in FIG. 1A.

In one of the two charging steps carried out in Charging Cell 1 (FIG. 1A, middle panel), Na-storage electrode 1, which was desodiated during the discharging process, is electrically coupled with a dechlorinated Cl-storage electrode in an aqueous solution 120 containing dissolved sodium and chloride ions to form a charging cell. When a cell bias is applied across the electrodes, sodium and chloride ions from the solution are taken up by desodiated Na-storage electrode 1 and the dechlorinated Cl-storage electrode, respectively. As a result of this charging process, Na-storage electrode 1 is re-sodiated and the Cl-storage electrode is chlorinated. Thus, this charging step carries out desalination of an aqueous solution. The cathode reaction, anode reaction, and overall desalination reaction can be represented generically as follows:

Cathode reaction ($Na^+$ storage reaction or sodiation of the Na-storage electrode):

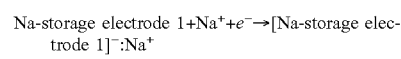

Anode reaction (Cl⁻ storage reaction or chlorination of the Cl-storage electrode):

Cl-storage electrode+Cl⁻[Cl-storage electrode]⁺:Cl⁻+e⁻

Overall Reaction (Desalination of the electrolyte):

Na-storage electrode 1+Cl-storage electrode+Na⁺+Cl⁻→[Na-storage electrode 1]⁻:Na⁺+[Cl-storage electrode]⁺:Cl⁻

Aqueous solutions that can be desalinated include salinated water containing dissolved sodium and chloride ions from a natural body of water, such as seawater, water from a salt lake, or brackish water. However, other electrolyte solutions containing sodium and chloride ions can be used, including geothermal brines and wastewater solutions from industrial processes.

In the other charging step carried out in Charging Cell 2 (FIG. 1A, right panel), Na-storage electrode 2, which was sodiated during the discharging process, is coupled with the Cl-storage electrode, which was chlorinated during the desalination process, in a solution 121 to form a second charging cell. When a cell bias is applied across the electrodes, sodium and chloride ions from sodiated Na-storage electrode 2 and the chlorinated Cl-storage electrode, respectively, are released into the charging cell solution. As a result of this charging process, Na-storage electrode 2 is desodiated and the Cl-storage electrode is dechlorinated. Thus, this charging step carries out salination of a charging cell solution and regenerates a desodiated Na-storage electrode and a dechlorinated Cl-storage electrode for reuse in a subsequent cycle. The cathode reaction, anode reaction, and overall salination reaction can be represented generically as follows:

Anode reaction (Na⁺ release reaction or desodiation of the Na-storage electrode):

[Na-storage electrode 2]⁻:Na⁺→Na-storage electrode+Na⁺+e⁻

Cathode reaction (Cl⁻ release reaction or dechlorination of the Cl-storage electrode):

[Cl-storage electrode]⁺:Cl⁻+e⁻→Cl-storage electrode+Cl⁻

Overall Reaction (Salination of the electrolyte):

[Na-storage electrode 2]⁻:Na⁺+[Cl-storage electrode]⁺:Cl⁻→Na-storage electrode+Cl-storage electrode+Na⁺+Cl⁻

It should be noted that the second charging step can also be carried out before the first charging step, in which case it is the dechlorinated Cl-storage electrode that is produced during salination that is subsequently used as the anode during the desalination charging step.

Electrolyte solutions that can be used in a salination cell are not particularly limited and can include a variety of dissolved ions. The electrolyte solutions may be acidic, neutral, or basic aqueous solutions, depending on the optimal operating conditions for the chosen electrodes. Because the electrolyte solution accumulates ions during the salination process, it can be referred to as an ion-recovery electrolyte solution.

The ESSs can further include a voltage source that applies a bias voltage across the cell electrodes to charge the cell and drive the desalination and salination processes. The charging process may be powered by a renewable energy source, such as solar, wind, or tidal power.

Importantly, in contrast to a conventional ARNB that uses the same two electrodes for both discharging and charging, in the dual-functional ESSs, the two charging cells perform the useful functions of solution desalination and salination concurrently with energy storage. Once the desalination and salination steps are completed, sodiated Na-storage electrode 1 and desodiated Na-storage electrode 2 can be re-coupled and used in a subsequent discharging step. In this manner, the ESSs can be cycled through many dischaging and charging cycles.

The sum of the energy inputs required for the desalination charging step and the salination charging step is comparable to that required for the single-step charging process when the same sodium storage electrodes (Na-storages electrodes 1 and 2) are used in a conventional ARNB. The sum of the energy inputs required for the two charging steps is also comparable to the energy output released during the discharging step. Because the charging process that requires an energy input is a necessary step for any battery to enable energy storage, by using desalination/salination as the charging reactions, the ESSs are essentially able to achieve desalination (i.e., the removal of dissolved sodium and chloride ions) with no extra energy input.

Chloride Storage Electrodes.

During the desalination process, the dechlorinated Cl-storage electrode serves as the anode and is oxidized. As discussed above, this oxidation reaction is coupled with the uptake of chloride ions (Cl⁻) by the anode from the electrolyte solution. Bismuth (Bi) is an example of a material that can be used as a dechlorinated Cl-storage electrode. When Bi is oxidized to BiOCl, it can remove Cl⁻ from the solution. The Cl-storage electrode can also contain Bi that is not in the form of Bi metal (Bi⁰), such as bismuth oxide ($Bi_2O_3$), which can be electrochemically reduced to Bi metal first and then serve as a Cl-storage electrode material. Other metals, such as silver (Ag), and non-metal materials, such as polypyrrole and polyaniline, that can store chloride upon oxidation also can be used as dechlorinated Cl-storage electrode material.

The Cl-storage electrode, as well as the other electrodes described herein, may include materials other than the active electrode material. For example, the electrodes may include a support substrate upon which the electrode material is deposited, a binder material in which the electrode material is dispersed, such as a polymeric binder (e.g., polytetrafluoroethylene; PTFE), that provides the electrode with structural integrity, and/or electrically conductive materials, such as carbon particles, that enhance the conductivity of the electrode.

Sodium Storage Electrodes.

During the desalination process, the desodiated Na-storage electrode (Na-storage electrode 1) serves as the cathode and is reduced. As discussed above, this reduction reaction is coupled with the uptake of sodium ions by the electrode from the electrolyte solution. The desodiated Na-storage electrode for the desalination process has a sodiation potential (i.e., a cathode potential) that is more negative than the chlorination potential of the dechlorinated Cl-storage electrode (i.e., the anode potential). In this case, the operation of the cell requires an energy input. Thus, this cell is a charging cell. $NaTi_2(PO_4)_3$ is an example material that can be used as a desodiated Na-storage electrode (Na-storage electrode 1) material during the desalination charging step, while its sodiated form ($Na_3Ti_2(PO_4)_3$) can be used as an anode material in the discharging process. However, any Na-storage electrode whose sodiation/desodiation potential is more negative than the chlorination/dechlorination potential of the Cl-storage electrode can be used as Na-storage electrode 1.

During the salination process, the sodiated Na-storage electrode (Na-storage electrode 2) serves as the anode and is oxidized. As discussed above, this oxidation reaction is coupled with the release of sodium ions from the electrode into the cell solution. The sodiated Na-storage electrode for the sodiation process has a desodiation potential (the anode potential) that is more positive than the dechlorination potential (the cathode potential) of the chlorinated Cl-storage electrode. In this case, the operation of the cell requires an energy input. Thus, the salination cell is also a charging cell. The sodiated form of nickel hexacyanoferrate (NiHCF, $Na_2NiFe^{II}(CN)_6$) is an example of an electrode material that can be used as a sodiated Na-storage electrode 2 during the salination process, while its desodiated form ($NaNiFe^{III}(CN)_6$) can be used as a cathode material in the discharging process. Other suitable Na-storage electrode materials for use as sodiated Na-storage electrode 2 include sodiated forms of $MnO_2$, $NaV_2(PO_4)_3$ (e.g., $Na_3V_2(PO_4)_3$), copper hexacyanoferrate (CuHCF), cobalt hexacyanoferrate (CoHCF), manganese hexacyanoferrate (MnHCF), and iron hexacyanoferrate (FeHCF). However, any Na-storage electrode whose sodiation/desodiation potential is more positive than the chlorination/dechlorination potential of the Cl-storage electrode can be used as Na storage electrode 2.

ESS Variations.

Figure 1B:
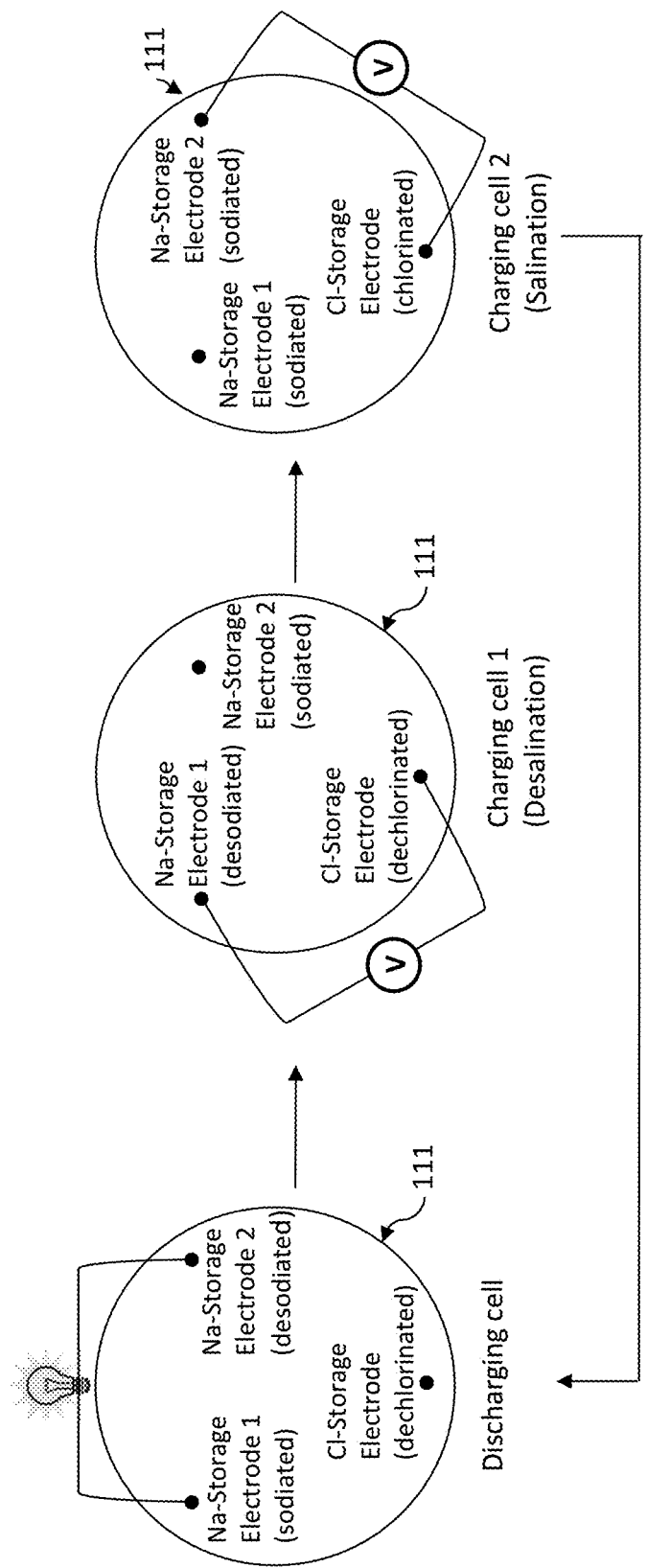
FIG. 1B is a schematic diagram showing the operation of a dual-function ESS in which the two charging cells and the discharging cell are contained in a single cell compartment.
Figure 1C:
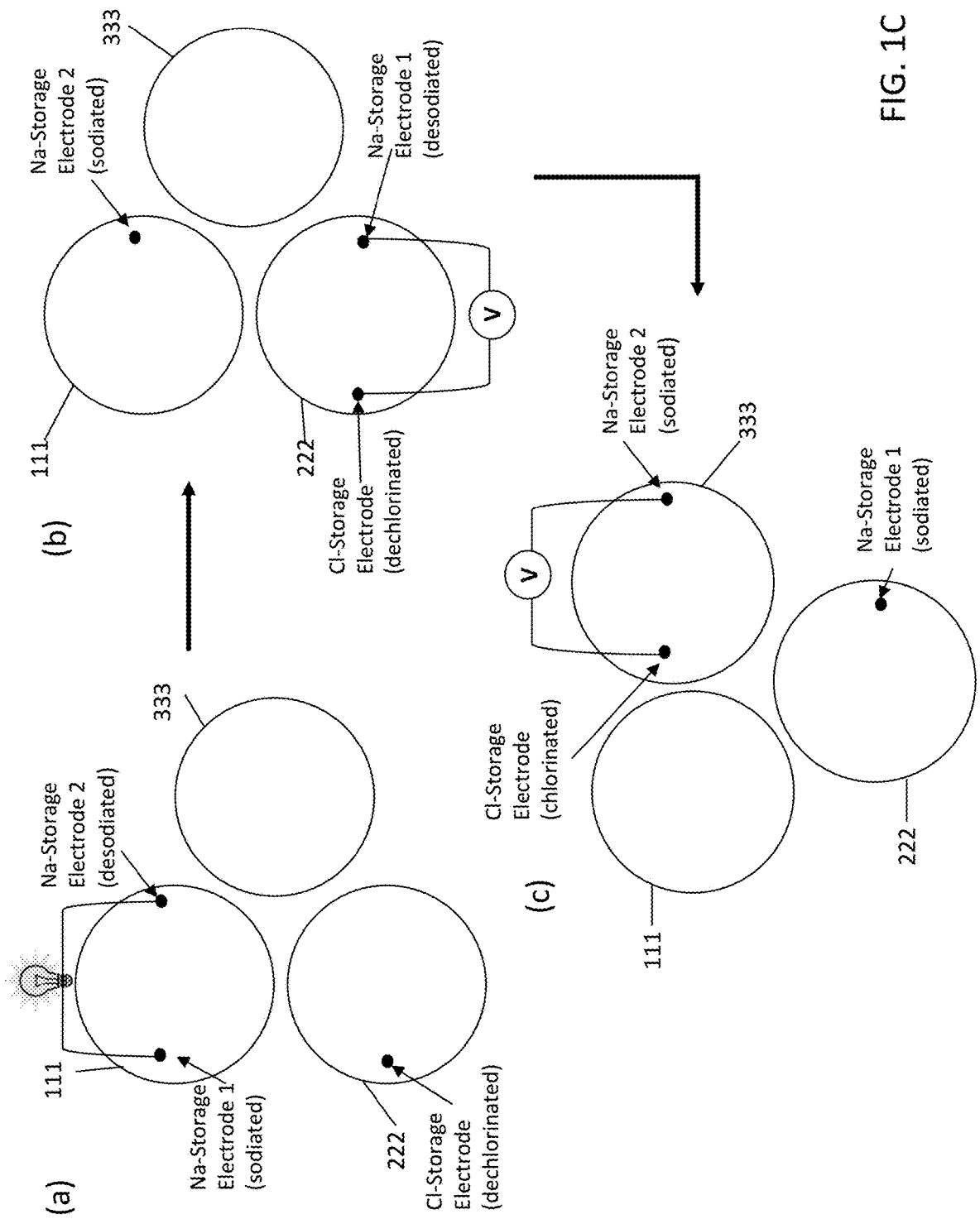
FIG. 1C is a schematic diagram showing the operation of a dual-function ESS in which the two charging cells and the discharging cell are contained in three separate cell compartments.
Figure 1D:
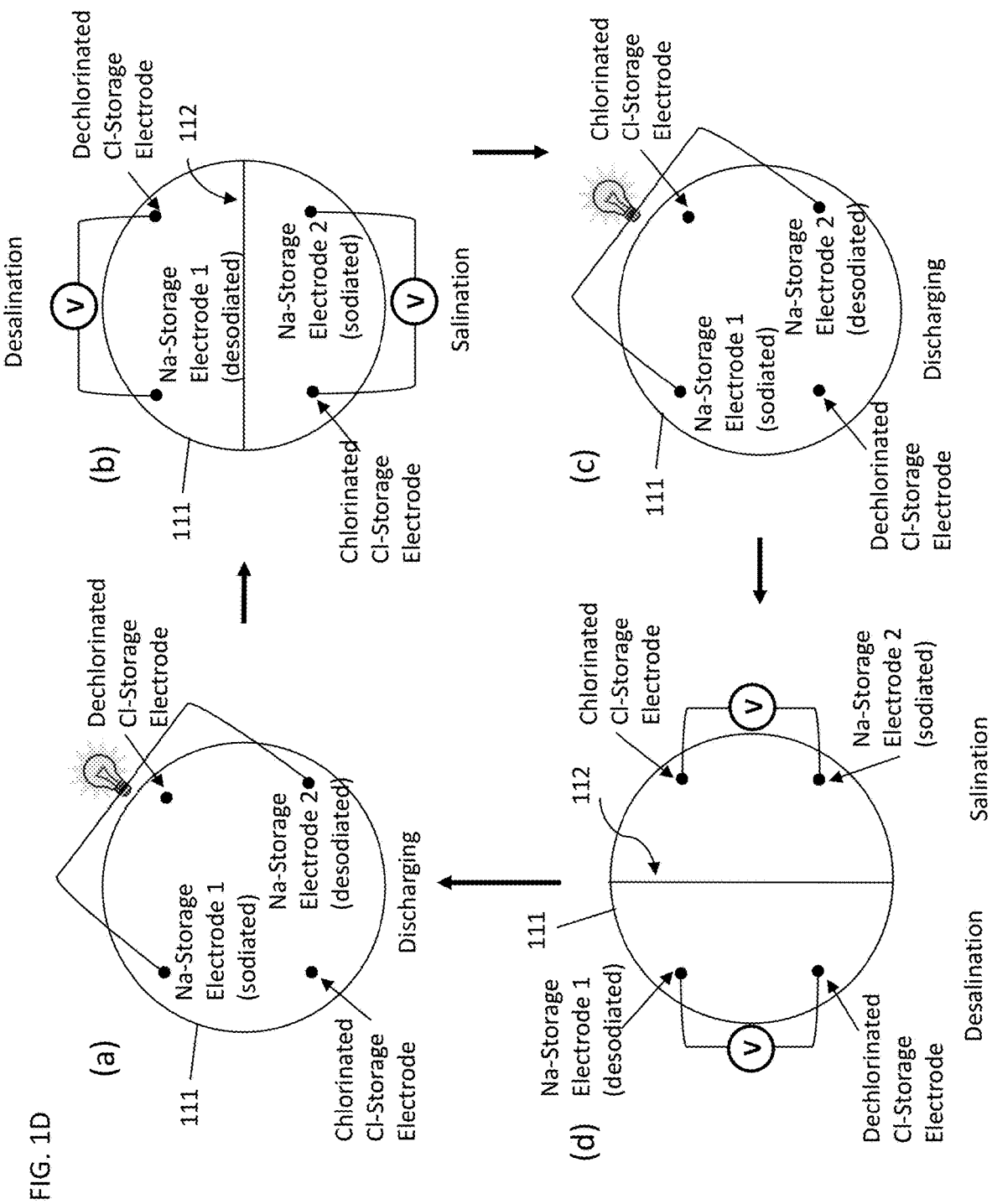
FIG. 1D is a schematic diagram showing the operation of a dual-function ESS in which the two charging steps can be carried out simultaneously.

In FIG. 1A, the discharging, desalination, and salination processes of the ESS are depicted as being carried out in three separate, dedicated cell containers 112, 104, and 108. However, these processes do not necessarily require the construction of three physically separated cells, and various engineering approaches can be used to design an efficient and practical system. For example, the desalination cell, the salination cell, and the discharging cell can all be contained in a single electrochemical cell compartment. In this ESS design, the two Na-storage electrodes and the Cl-storage electrode can be placed in a single cell container that defines a single compartment and the electrical connections between the electrodes and the electrolyte solution within the compartment can be changed, depending on the charging or discharging process to be performed. This is depicted schematically in FIG. 1B, wherein the ESS has a single cell compartment 111 that contains Na-storage electrode 1, Na-storage electrode 2, and the Cl-storage electrode. (The sodiation/desodiation and chlorination/dichlorination states of the electrodes in each panel of FIGS. 1B-1D are shown just before the charging and discharging steps are initiated.) When the cell is configured to act as a discharging cell, the two Na-storage electrodes are connected via an external circuit. Na-storage electrode 1 serves as the anode and Na-storage electrode 2 serves as the cathode (FIG. 1B, left panel).

Once the discharging process is complete, an external voltage source is connected across Na-storage electrode 1 and Cl-storage electrode 2 to drive desalination of an electrolyte (FIG. 1B, middle panel). In this configuration, Na-storage electrode 1 now acts as the cathode, while the Cl-storage electrode acts as the anode. Once the desalination cell has been charged, the connection between the electrodes can then be reconfigured to carry out the salination step, which regenerates the electrodes for another cycle of desalination and discharging. This is shown in the right panel of FIG. 1B, where Na-storage electrode 2, which acts the anode, is connected to the Cl-storage electrode, which acts as the cathode. Between the charging and discharging processes, the electrolyte solution in cell compartment 111 can be changed, depending upon the process being carried out. Cell compartment 111 can be equipped with separate outlets to drain the desalinated water generated by the desalination charging step and the salinated electrolyte solution generated by the salination charging step.

The same charging (desalination and salination) and discharging steps also can be carried out in a dual-function ESS set-up having three dedicated cell compartments 111 (discharging cell compartment), 222 (desalination cell compartment), and 333 (salination cell compartment) by moving the electrodes between the different cell compartments, as shown in FIG. 1C. In this configuration, each cell compartment can be equipped with its own electrolyte solution input and output ports. In FIG. 1C the discharging, desalination, and salination processes are depicted in panels (a), (b), and (c), respectively. After the salination step (panel (c)), desodiated Na-storage electrode 2 can be moved from cell compartment 333 into cell compartment 222, thereby converting cell compartment 222 into a discharging cell compartment. Alternatively, both sodiated Na-storage electrode 1 and desodiated Na-storage electrode 2 can be moved back into cell compartment 111 to begin another cycle.

In an alternative illustrative embodiment, the two charging steps (desalination and salination) are carried out simultaneously. This can be accomplished, for example, using a cell container 111 with a movable divider 112 configured to separate the cell container into two separate cell compartments for simultaneous desalination and salination, as shown in FIG. 1D. In this configuration, the setup includes two Cl-storage electrodes composed of the chloride storage material, one in its chlorinated form and the other in its dechlorinated form. By way of illustration, if the first Cl-storage electrode is Bi, then BiOCl can be used as the other Cl-storage electrode. The operation of this embodiment of a dual-function ESS is depicted in FIG. 1D, where the panels (a), (b), (c), and (d) depict the electrode configuration and connectivity during a first discharge step, a first simultaneous two-step charge (desalination+salination), a second discharge step, and a second simultaneous two-step charge, respectively. (Again, the sodiation/desodiation and chlorination/dechlorination states of the electrodes in each panel are shown just prior to charging or discharging.) Between the charging and discharging processes, the electrolyte solution in cell container 111 can be changed, depending upon the process being carried out. The desalination and salination compartments can be equipped with outlets to drain the desalinated water and the salinated electrolyte solution. The electrolyte solutions can be stationary in the cell compartment during charging and discharging, as in the case of batch processing, or they can be flowing through the cell during charging and discharging, as in the case of continuous processing.

The ESS may also include a mechanical repositioning system that is configured to (i.e., specifically designed to) move electrodes between cell compartments, reposition movable dividers within a cell container, and/or change the electrical connections between electrodes. The mechanical repositioning system is an automated mechanical device comprising components configured to carry out one or more of the actions described above. Such components include, but are not limited to, one or more robotic arms and/or translating, rotating, and/or pivoting positioning stages. The movement of the components of the mechanical repositioning system can be computer-controlled. Computer-control can be carried out using a processor and data storage (e.g., a computer-readable medium). A computer-readable medium is an electronic holding place or storage for information so the information can be accessed by the processor as understood by those skilled in the art. The computer-readable medium can include, but is not limited to, any type of random-access memory (RAM), any type of read only memory (ROM), any type of flash memory, smart cards, and the like. The processor executes instructions that may be carried out by a special purpose computer, logic circuits, hardware circuits, or other methods. The processor may be implemented in hardware and/or firmware. The processor executes an instruction, meaning it performs/controls the operations called for by that instruction. The instructions may be written using one or more programming language, scripting language, assembly language, etc. The data stored in the computer-readable medium can include instructions for carrying out the mechanical movements of one or more components of the mechanical repositioning system.

Additional components that may be part of a dual-function ESS include, but are not limited to, flow conduits through which electrolyte solutions, desalinated water, and/or washing solutions can enter and exit cell compartments, pumps and valves for controlling the flow of electrolyte solutions, desalinated water, and/or washing solutions, electrolyte solution reservoirs in fluid communication with the cell compartments, and/or downstream processing units that carry out further chemical reactions and/or separations on the desalinated solutions that exit the desalination cells and/or the salinated solutions that exit the salination cells.

ESSs for Lithium Extraction.

It should be noted that the ESSs described above can be readily converted into ESSs that couple energy storage and release with lithium-ion extraction and recovery, rather than desalination. In these ESSs, two lithium storage electrodes (Li-storage electrodes 1 and 2) are used instead of the two sodium storage electrodes (Na-storage electrodes 1 and 2) in the above-described ESSs, wherein one of the Li-storage electrodes has a more negative lithiation potential than the other. In order to maximize the voltage output during discharging the lithiation potential of the first Li-storage electrode ("Li-storage electrode 1") should be closer to the water reduction potential and the lithiation potential of the second Li-storage electrode ("Li-storage electrode 2") should be closer to the water oxidation potential.

The ESSs for lithium extraction and recovery have the same operating principles and lay-out as the ESSs for desalination, except that lithium ions and chloride ions are removed from an aqueous solution containing dissolved lithium and chloride ions in one of the two charging steps (lithium extraction), lithium ions and chloride ions are released into an electrolyte solution during the other of the two charging steps (lithium recovery), and lithium ions, rather than sodium ions, are transferred from the anode to the cathode during the discharge process. The ESSs for lithium extraction and recovery can use the same types of chloride storage electrodes that are used in the ESSs for desalination. For example, suitable materials for Li-storage electrode 1 include $VO_2$, $TiP_2O_7$, $TiO_2$, $LiTi_2(PO_4)_3$, and suitable materials for Li-storage electrode 2 include $LiMn_2O_4$, $MnO_2$, $LiCoO_2$, $LiNi_{1/3}Co_{1/3}Mn_{1/3}O_2$, $LiFePO_4$, $LiMnPO_4$, CuHCF, NiHCF.

Aqueous solutions from which lithium can be extracted include water containing dissolved lithium and chloride ions from a natural body of water, such as seawater, water from a salt lake, or brackish water, including geothermal brines, and wastewater solutions from industrial processes.

Example

Figures 2A, 2B:
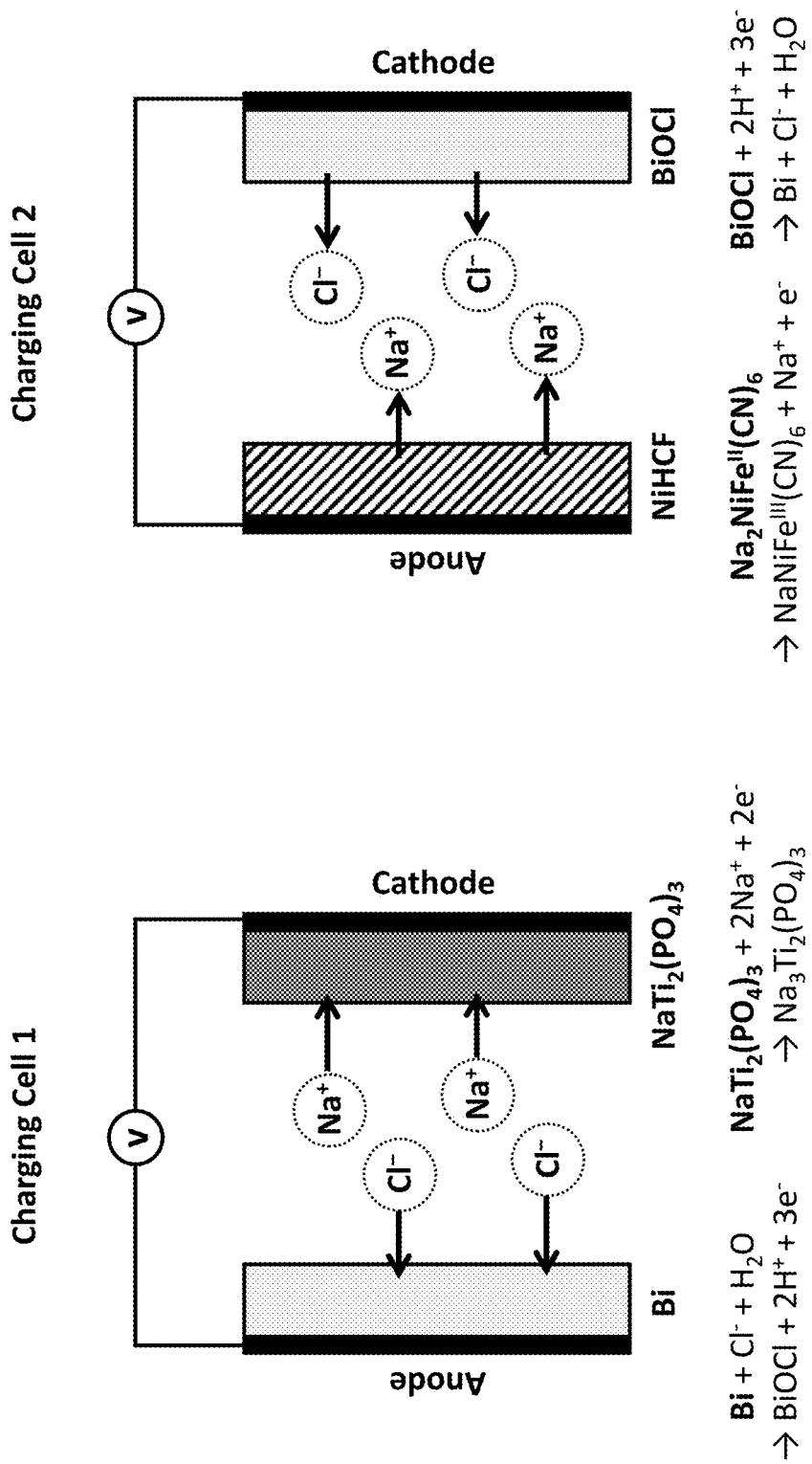
FIGS. 2A-2F. A schematic diagram illustrating the operation of (FIG. 2A) Charging Cell 1, (FIG. 2B) Charging Cell 2, and (FIG. 2C) Discharging Cell with the expected cathode and anode potentials for (FIG. 2D) Charging Cell 1, (FIG. 2E) Charging Cell 2, and (FIG. 2F) Discharging Cell.

This example demonstrates a dual-purpose ESS for seawater desalination and energy generation. The ESS uses two Na-storage electrodes and one Cl-storage electrode to construct two charging cells and one discharging cell. Charging Cell 1 is composed of NASICON-type $NaTi_2(PO_4)_3$ as the Na-storage electrode and Bi as the Cl-storage electrode (FIG. 2A). In this cell, Na-storage by $NaTi_2(PO_4)_3$ and Cl-storage by Bi occur through the following reactions to achieve desalination:

Cathode reaction: $3/2NaTi_2(PO_4)_3 + 3Na^+ + 3e^- \rightarrow 3/2Na_3Ti_2(PO_4)_3$ 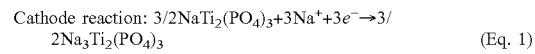 (Eq. 1)

Anode reaction: $Bi + Cl^- + H_2O \rightarrow BiOCl + 2H^+ + 3e^-$  (Eq. 2)

Figures 2C, 2D:
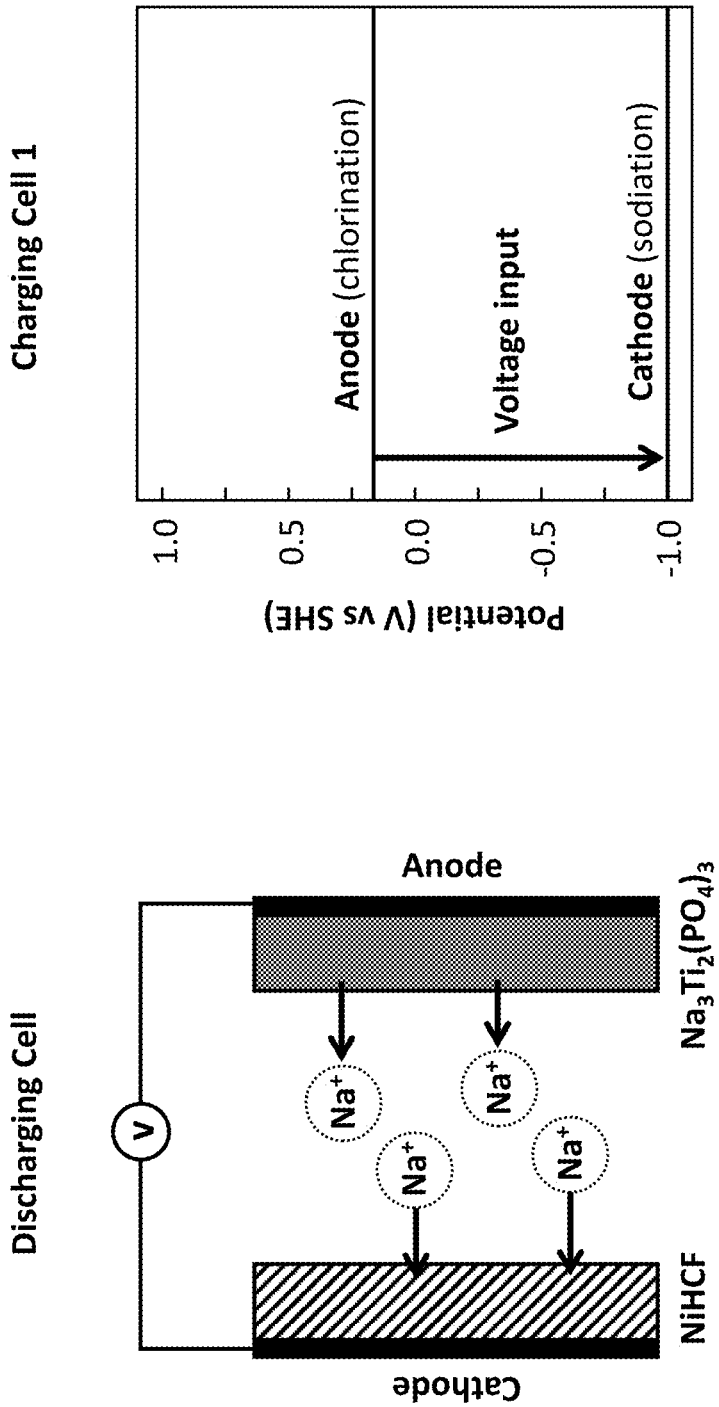

In this cell, the cathode potential (sodiation potential of $NaTi_2(PO_4)_3$) is more negative than the anode potential (chlorination potential of Bi), which means that the cell potential ($E_{cell}$, $E_{cell} = E_{cathode} - E_{anode}$) is negative (FIG. 2D). Thus, the overall reaction is non-spontaneous and requires an energy input, equivalent to charging. During operation of the cell, $Na^+$ and $Cl^-$ are removed from the feedwater and so Charging Cell 1 is also a desalination cell. (In this example, 0.6 M NaCl was used as an electrolyte that mimics the salinity of seawater.) Because the removal of $Na^+$ and $Cl^-$ in the desalination charging cell occurs through ion-specific electrode reactions, desalination is achieved without the use of a membrane.

Charging Cell 2 is composed of a sodiated nickel hexacyanoferrate (NiHCF) electrode and a chlorinated Bi electrode, BiOCl (FIG. 2B). NiHCF is a type of Prussian Blue Analogue (PBA) with the nominal formula $A_xMFe(CN)_6 \cdot nH_2O$ (A: alkali metal ion, M: divalent transition metal ion, $2 \leq x \leq 2$). In this cell, $Cl^-$ is released from BiOCl through the reverse reaction of Eq. 2 (Eq. 3), and $Na^+$ is released from NiHCF (Eq. 4).

Cathode reaction: $BiOCl + 2H^+ + 3e^- \rightarrow Bi + Cl^- + H_2O$ 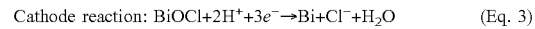 (Eq. 3)

Anode reaction: $3Na_2NiFe^{II}(CN)_6 \rightarrow 3NaNiFe^{III}(CN)_6 + 3Na^+ + 3e^-$ 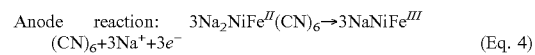 (Eq. 4)

Figures 2E, 2F:
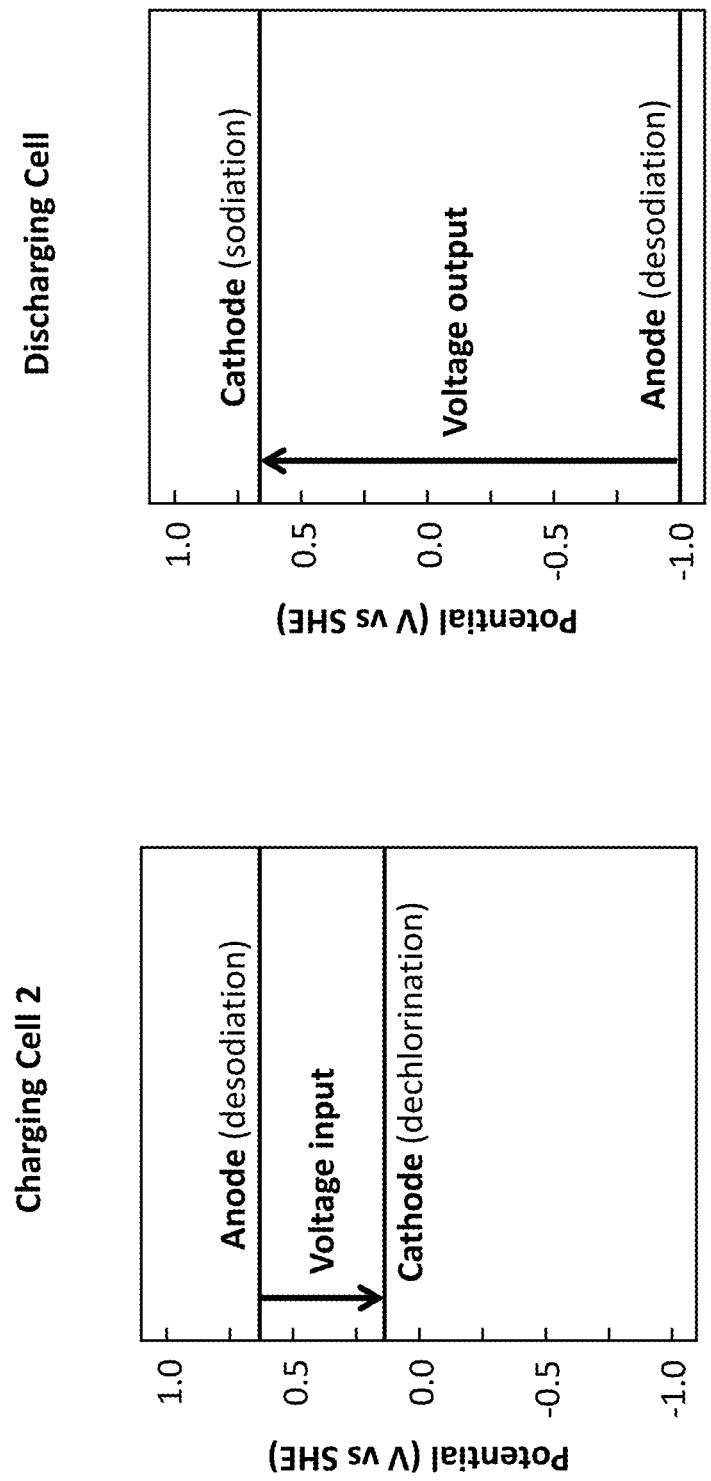

In this cell, the cathode potential (dechlorination potential of BiOCl) is more negative than the anode potential (desodiation potential of NiHCF), which means that $E_{cell}$ is negative (FIG. 2E). Thus, the overall reaction is non-spontaneous and requires an energy input, equivalent to charging. Because $Na^+$ and $Cl^-$ are released into the feedwater during the cell reaction, Charging Cell 2 is also a salination cell.

Discharging Cell is composed of a sodiated $NaTi_2(PO_4)_3$ electrode (i.e., $Na_3Ti_2(PO_4)_3$) and a desodiated NiHCF electrode (FIG. 2C). In this cell, $Na^+$ is released from $Na_3Ti_2(PO_4)_3$ (reverse reaction of Eq. 1) and inserted into NiHCF (reverse reaction of Eq. 4). In this cell, the cathode potential (sodiation potential of NiHCF) is more positive than the anode potential (desodiation potential of $NaTi_2(PO_4)_3$), which means that $E_{cell}$ is positive (FIG. 2F). Thus, the overall reaction is spontaneous and generates an energy output, equivalent to discharging. As the desodiation potential of $NaTi_2(PO_4)_3$ is very close to the water reduction potential, and the sodiation potential of NiHCF is very close to the water oxidation potential, the combination of these two electrodes enables the generation of the maximum output voltage allowed for ARNBs. When the discharging process is complete, the desodiated $NaTi_2(PO_4)_3$ electrode can be used in Charging Cell 1, and the sodiated NiHCF electrode can be used in Charging Cell 2 to allow for repeated charging and discharging cycles.

In a typical ARNB, the same two electrodes are used for both discharging and charging, and the input voltage required for charging is comparable to the output voltage generated during discharging. In the ESS of this example, rather than combining $NaTi_2(PO_4)_3$ and NiHCF to perform the charging process, the charging process is divided and performed in two separate cells. In the charging cells, $NaTi_2(PO_4)_3$ and NiHCF are both combined with Bi/BiOCl that has a chlorination/dechlorination potential that lies between the sodiation/desodiation potentials of $NaTi_2(PO_4)_3$ and NiHCF. This new cell design provides two major advantages. First, while the typical charging process is used only to store energy, in the new design the two charging cells perform desalination (Charging Cell 1) and salination (Charging Cell 2) concurrently with energy storage. As a result, the new device achieves desalination during charging and generates electricity during discharging. Second, the input voltage required for the charging process of Charging Cell 1 and Charging Cell 2 is approximately half of the input voltage that would be required to charge the cell composed of $NaTi_2(PO_4)_3$ and NiHCF electrodes. While the total energy required to charge the system does not change, the use of charging cells that require a lower input voltage may enable these cells to utilize a greater fraction of renewable electricity with fluctuating power. These two advantages increase the efficacy of the ARNB system.

Electrode Preparation

Bi was chosen for use as the Cl-storage electrode because of its relatively low cost, high specific capacity of 384.75 mAh g$^{-1}$ (Cl-storage capacity=169.6 $mg_{Cl}/g_{Bi}$), exceptional stability in a wide range of pH conditions, and high Faradaic efficiency for Cl$^-$ removal.

Figure 3B:
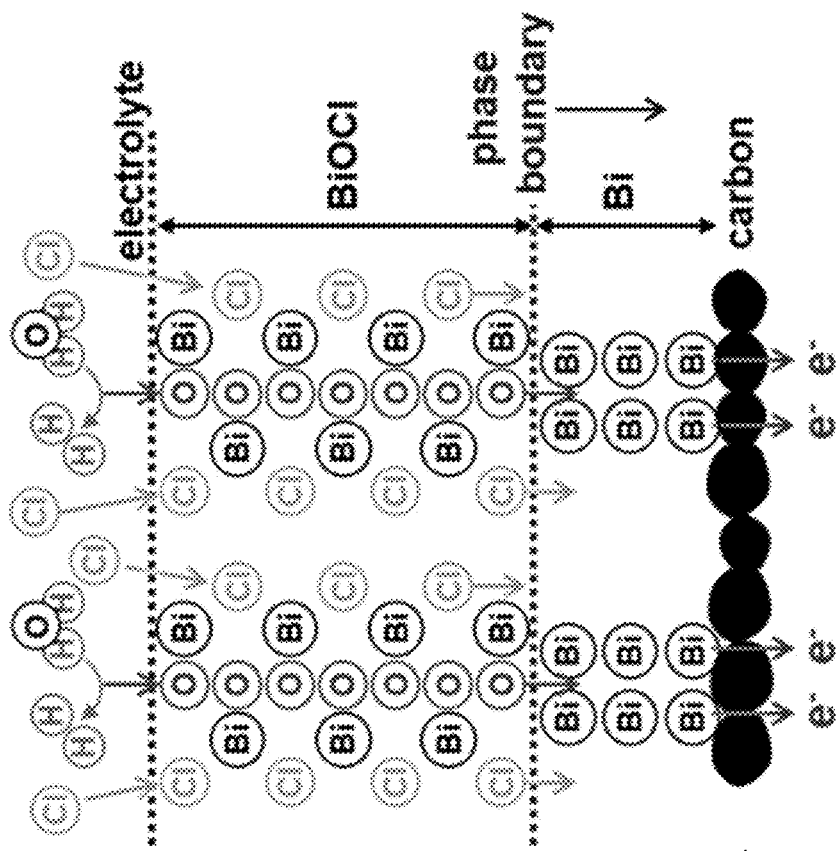
FIG. 3B shows a diagram depicting the growth of BiOCl upon oxidation of Bi through the insertion of $Cl^-$ and $O^{2-}$ into the Bi lattice. The Bi/BiOCl phase boundary moves from the Bi/electrolyte interface toward the Bi/carbon interface.
Figure 3A:
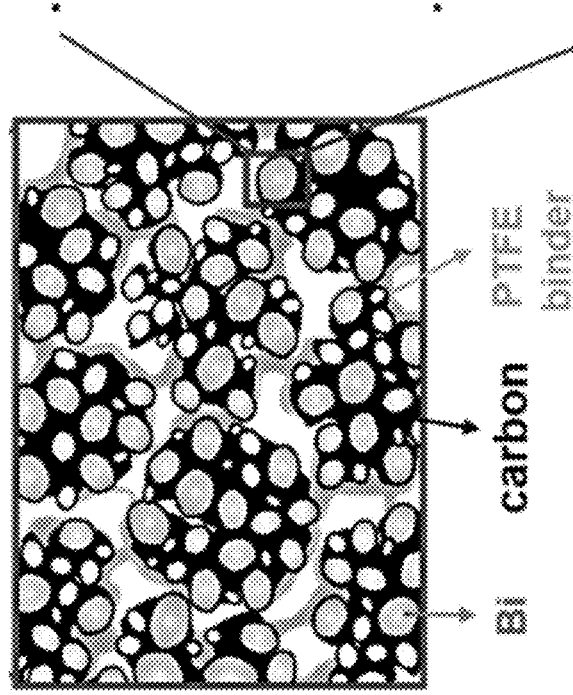
FIG. 3A shows a schematic illustration of the structure of the sheet-type Bi electrode.

The Bi electrode was prepared as sheet-type electrodes. In this process, a high-energy ball mill was used to mix Bi powder with a conductive carbon agent. A polytetrafluoroethylene (PTFE) binder was then added to the Bi/carbon mixture and a rolling-pressing procedure was used to fabricate sheet-type electrodes. The sheet-type electrodes were flexible and mechanically robust; they could bend without cracking or delaminating from a current collector. In the sheet-type electrode, individual Bi particles were encapsulated by carbon and binder coating layers (FIG. 3A).

An effective strategy that was employed to increase the cyclability of Bi was to use $Bi_2O_3$ particles instead of Bi particles to fabricate the sheet-type electrodes. The use of $Bi_2O_3$ resulted in good adhesion with carbon. After electrode fabrication, the resulting sheet-type $Bi_2O_3$ electrodes were first electrochemically reduced to Bi. The Bi electrodes were then used for the conversion between Bi and BiOCl through chlorination and dechlorination.

Figure 3C:
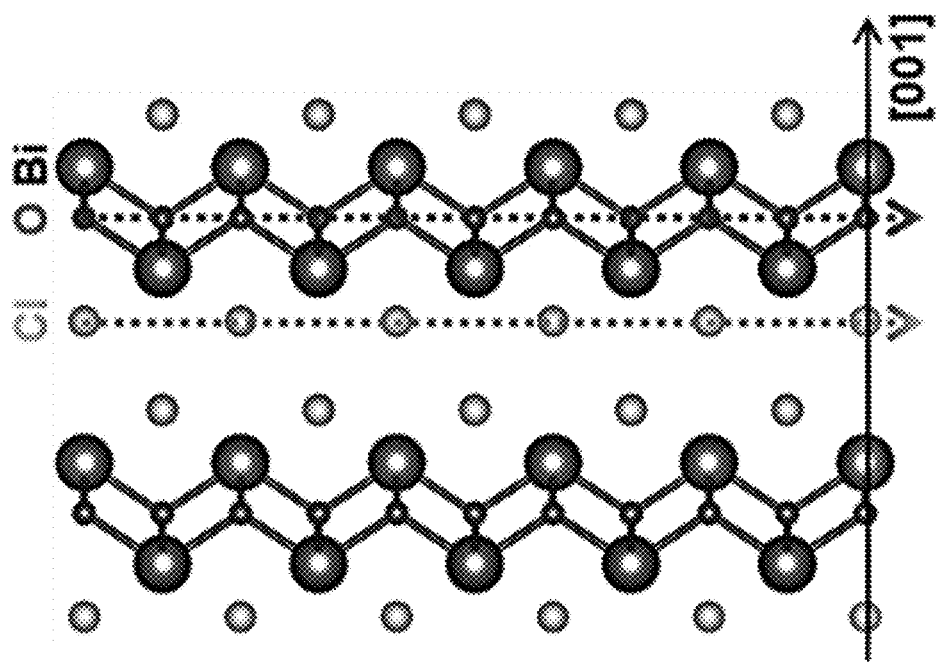
FIG. 3C shows the crystal structure of BiOCl composed of 2D BiOCl layers stacked perpendicular to the [001] direction. The movement of $Cl^-$ and $O^{2-}$ can readily occur along directions perpendicular to the [001] direction.

Bi was not completely converted to BiOCl during the cycling tests. Instead, only ~33% of the Bi was used for electrochemical reactions, and the remaining Bi was used to maintain the structural integrity of the electrode. During chlorination, the formation of BiOCl began at the Bi/electrolyte interface, and the Bi/BiOCl phase boundary moved from the Bi/electrolyte interface toward the Bi/carbon interface (FIGS. 3B-3C). Therefore, by limiting the capacity during the cycling tests, the Bi at the Bi/carbon interface remained as Bi to maintain good electrical contact to carbon.

The cycle performance of the Bi electrode was evaluated in 0.6 M NaCl, an electrolyte that mimics the salinity of seawater. The Bi electrodes were cycled galvanostatically at a current density of ±4 mA cm$^{-1}$ (~1.5 C-rate) with cutoff potentials of 0.7 V and -1.45 V vs Ag/AgCl for chlorination and dechlorination, respectively.

Figure 4B:
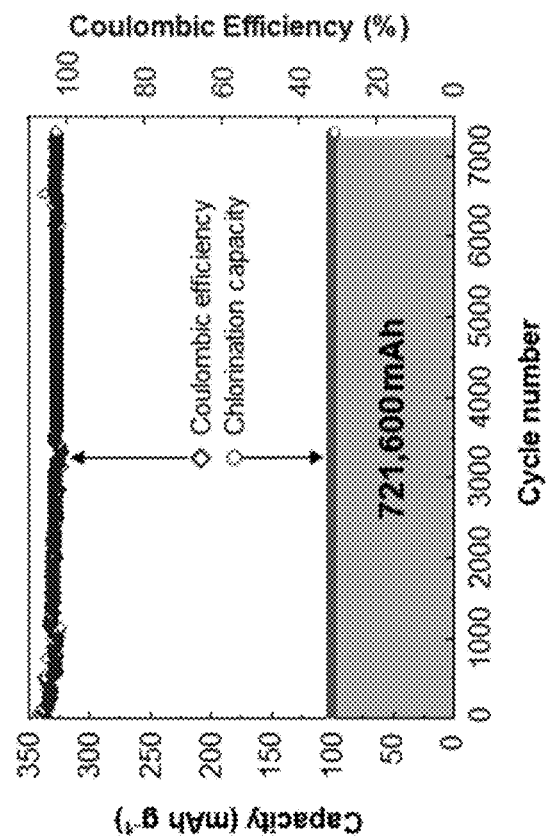
FIG. 4A shows potential-capacity plots and FIG. 4B shows the cyclability and Coulombic efficiency in 0.6 M NaCl at ±4 mA $cm^{-2}$ with cutoff potentials of −1.45 V and 0.7 V vs Ag/AgCl when the chlorination capacity was restricted to 100 mAh $g^{-1}$.
Figure 4A:
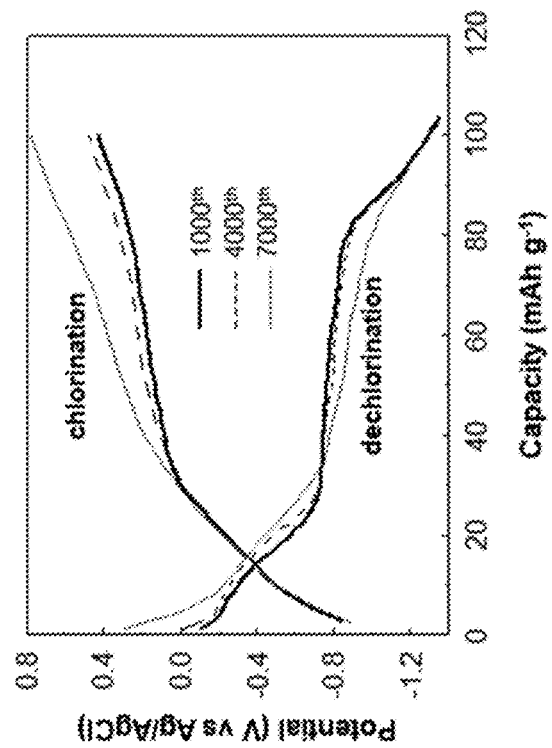

When the chlorination capacity was restricted to 100 mAh g$^{-1}$ (~33% of the full capacity), a capacity of 100 mAh g$^{-1}$ was maintained for 7200 cycles with no decrease in performance (FIGS. 4A-4B). When the Bi electrode operates with a restricted capacity, the Bi that does not participate in the electrochemical reactions acts as an inexpensive conductive and structural component of the electrode. The rational design of electrode fabrication and operational conditions presented here enabled the use of Bi electrodes for more than 7000 cycles with no loss in performance, allowing for the use of Bi in practical ESS and desalination applications.

Figure 4C:
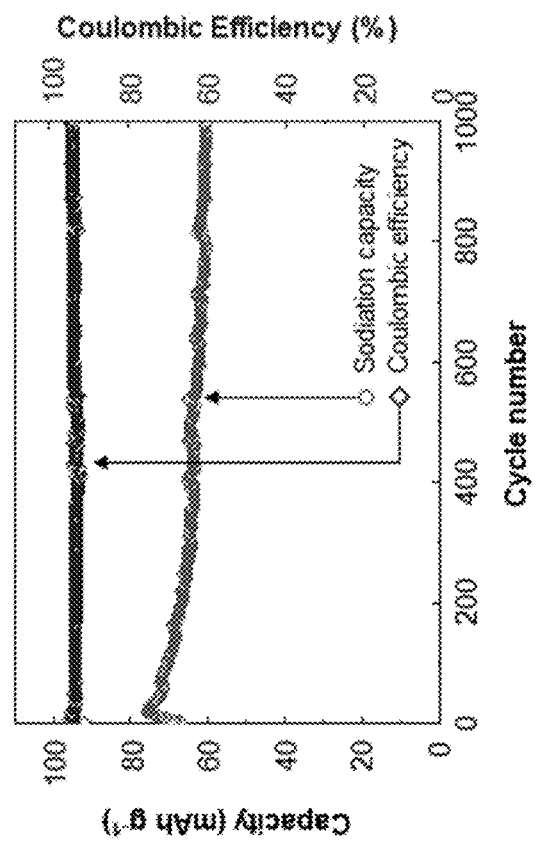
FIG. 4C shows potential-capacity plots and FIG. 4D shows the cyclability and Coulombic efficiency of the $NaTi_2(PO_4)_3$ electrode in 0.6 M NaCl at ±2 mA $cm^{-2}$ with cutoff potentials of −0.93 V and −0.2 V vs Ag/AgCl.

The $NaTi_2(PO_4)_3$ electrode was also fabricated as a sheet-type electrode following the same procedure. Detailed synthesis conditions and structural characterization of $NaTi_2(PO_4)_3$ powder, as well as the electrode fabrication procedure, can be found in the experimental section. The cycle performance of the sheet-type $NaTi_2(PO_4)_3$ electrode was investigated in 0.6 M NaCl at a current density of ±2 mA cm$^{-2}$ (~1.5 C-rate based on a theoretical capacity of 133 mAh g$^{-1}$) with cutoff potentials of -0.93 V and -0.2 V vs Ag/AgCl for sodiation and desodiation, respectively. The potential-capacity plots obtained during sodiation and desodiation are shown in FIG. 4C. The average potentials observed during sodiation and desodiation were -0.83 V vs Ag/AgCl (4 M KCl) and -0.71 V vs Ag/AgCl (4 M KCl), respectively.

Figure 4D:
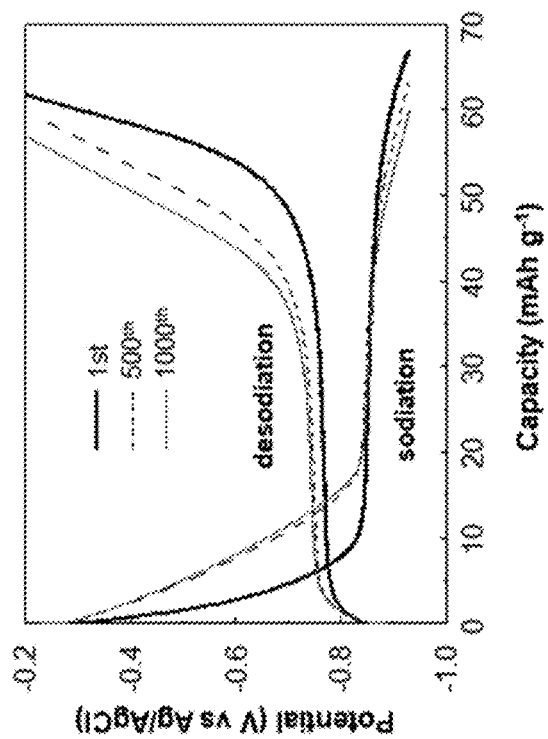

The change in the sodiation capacity over 1000 cycles is shown in FIG. 4D. The initial sodiation capacity of the $NaTi_2(PO_4)_3$ electrode was 66.83 mAh g$^{-1}$ and it decreased slightly to 56.85 mAh g$^{-1}$ after 1000 cycles, corresponding to a capacity retention of 85.1%.

The NiHCF electrode was also fabricated as a sheet-type electrode using the same procedure. Detailed synthesis conditions and structural characterization of NiHCF powder, as well as the electrode fabrication procedure, can be found in the experimental section. The cycle performance of the sheet-type NiHCF electrode was investigated in 0.6 M NaCl at a current density of ±4 mA cm$^{-2}$ (~6 C-rate) with cutoff potentials of 0.0 V and 0.9 V vs Ag/AgCl for sodiation and desodiation, respectively. The potential-capacity plots obtained during sodiation and desodiation are shown in FIG. 4E. The average potentials observed during sodiation and desodiation were 0.36 V vs Ag/AgCl (4 M KCl) and 0.56 V vs Ag/AgCl (4 M KCl), respectively.

Figure 4F:
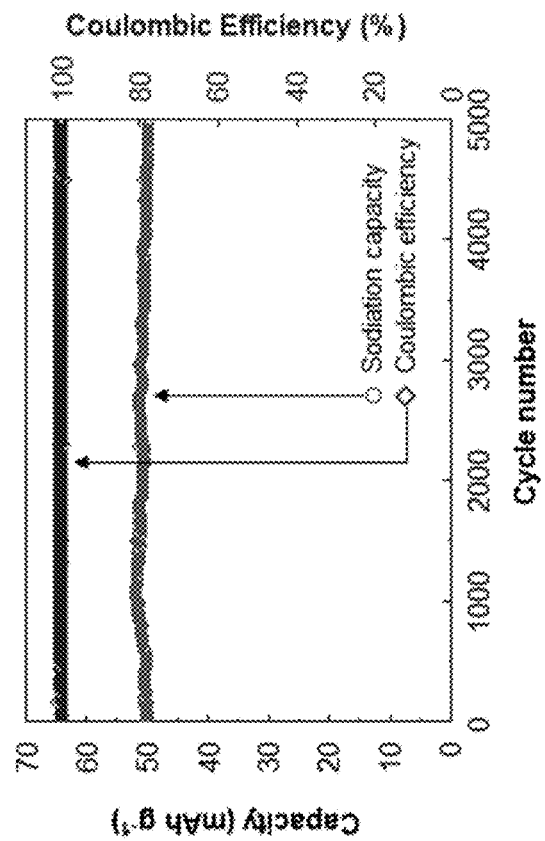
FIG. 4E shows potential-capacity plots and FIG. 4F shows the cyclability and Coulombic efficiency of the NiHCF electrode in 0.6 M NaCl at ±4 mA $cm^{-2}$ with cutoff potentials of 0.0 V and 0.9 V vs Ag/AgCl.
Figure 4E:
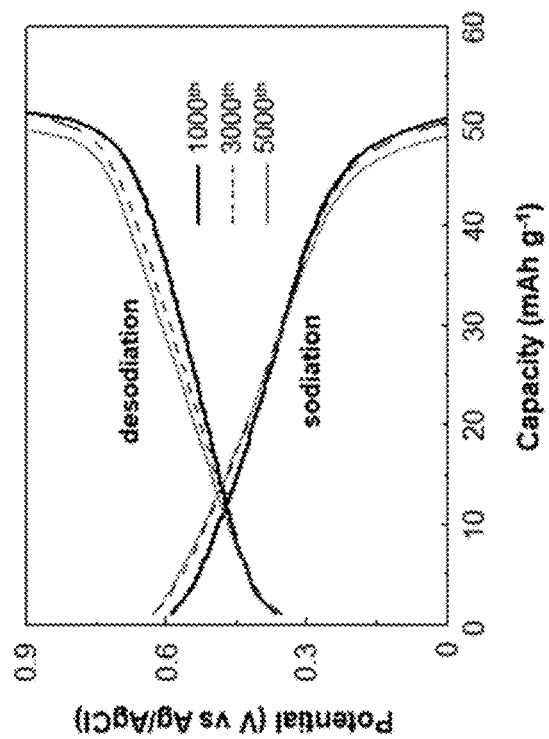

The long-term cycle performance of the NiHCF electrode is shown FIG. 4F. The initial sodiation capacity of the NiHCF electrode was 50.25 mAh g$^{-1}$ and the sodiation capacity after 5000 cycles was 49.6 mAh g$^{-1}$, corresponding to a capacity retention of 98.7% (FIG. 4F). Furthermore, the NiHCF electrode demonstrated an impressive Coulombic efficiency of 99.8% throughout the cycling test. A Coulombic efficiency near 100% illustrates the highly reversible redox properties of NiHCF and indicates that no parasitic side reactions or irreversible phase transitions occurred during the cycling test.

Operation of Charging and Discharging Cells

The energy storage and release processes and the desalination performance of the aqueous rechargeable system combining Bi, $NaTi_2(PO_4)_3$, and NiHCF electrodes were investigated galvanostatically. During the cell operation, the individual potentials of the anode and cathode were monitored against an Ag/AgCl reference electrode.

The performance of Charging Cell 1 composed of Bi and $NaTi_2(PO_4)_3$ electrodes was investigated in 0.6 M NaCl at a current density of 1.33 mA cm$^{-2}$ (~0.5 C-rate based on the Bi electrode) until the capacity of the Bi electrode reached 100 mAh g$^{-1}$ (FIG. 5A). The individual potential profiles show that the reduction of $NaTi_2(PO_4)_3$ (sodiation/cathode) occurred at -0.807 V vs Ag/AgCl while the oxidation of Bi to BiOCl (chlorination/anode) occurred at -0.067 V vs Ag/AgCl. Thus, the average input voltage required to operate Charging Cell 1 is 0.74 V. Charging Cell 1 also removed $Na^+$ and $Cl^-$ from the electrolyte to achieve desalination.

The performance of Charging Cell 2 composed of Bi and NiHCF electrodes was examined in an acidic solution containing 70 mM HCl (pH 1.3). An acidic solution was used to improve the dechlorination kinetics of BiOCl, and therefore decrease the input voltage required to operate Charging Cell 2. Because dechlorination of BiOCl involves the release of both $Cl^-$ and $O^{2-}$ from the BiOCl lattice (reverse of FIG. 3B), the use of an acidic electrolyte where Et can serve as an $O^2$ acceptor can drastically reduce the overpotential required for the reduction of BiOCl. While Charging Cell 1 was designed to achieve seawater desalination and, therefore, must use seawater as the feedwater, Charging Cell 2 was designed to regenerate the Bi electrode and does not need to use seawater as the feedwater; the choice of electrolyte for Charging Cell 2 is flexible. Therefore, an acidic electrolyte was used to minimize the energy input required for Charging Cell 2. (Acidic wastewater or acidified seawater can be used for the practical implementation of Charging Cell 2.)

Other than the electrolyte type, the performance of Charging Cell 2 was investigated with the same operating conditions as Charging Cell 1 (FIG. 5B). The individual potential profiles show that the reduction of BiOCl to Bi (dechlorination/cathode) occurred at −0.147 V vs Ag/AgCl while the oxidation of NiHCF (desodiation/anode) occurred at 0.367 V on average, indicating that the Bi/NiHCF cell requires an average input voltage of 0.514 V (FIG. 5B).

The performance of Discharging Cell composed of NiHCF and $NaTi_2(PO_4)_3$ electrodes was investigated in 0.6 M NaCl at a current density of 1.33 mA cm$^{-2}$. The individual potential profiles show that the reduction of NiHCF occurred at 0.41 V (sodiation/cathode) on average while the oxidation of $NaTi_2(PO_4)_3$ occurred at −0.78 V (desodiation/anode) on average, resulting in an average output voltage of 1.19 V. Considering that the thermodynamic electrochemical stability window of aqueous electrolytes is 1.23 V due to the occurrence of water oxidation and water reduction, the output voltage reported here approaches the thermodynamic limit. Therefore, the combination of NiHCF and $NaTi_2(PO_4)_3$ electrodes is suitable to construct an ARNB with a maximum output voltage.

The energy efficiency of the system (energy output divided by energy input, multiplied by 100%) was examined by dividing the output energy generated by Discharging Cell by the sum of the input energies required to operate Charging Cells 1 and 2. The energy output and inputs required for the electrochemical reactions were calculated by integrating the areas between the cell voltage (the difference between the cathode and anode potentials) and capacity plots (the shaded regions in FIGS. 5A-5C). The capacities of the three cells were slightly different (100 mAh/$g_{Bi}$ for Charging Cell 1, 105.29 mAh/$g_{Bi}$ for Charging Cell 2, and 105.36 mAh/$g_{Bi}$ for Discharging Cell). This is because the Coulombic efficiency of the Bi electrode is slightly higher than 100% (FIG. 4B) (i.e., the dechlorination capacity is slightly greater than the chlorination capacity). When the as-obtained potential-capacity plots of Charging Cells 1 and 2 and Discharging Cell were used to calculate the energy efficiency of the system, the energy efficiency was overestimated (~99%). In order to obtain a more accurate energy efficiency, the capacities of all three cells were normalized to be identical (100 mAh), which would have been the case if the Coulombic efficiency of the Bi electrode was 100%. The capacity plots shown in FIGS. 5A-5C are after normalization. With the potential-capacity plots shown in FIG. 5A-5B, the energy inputs required for Charging Cell 1 and Charging Cell 2 were calculated to be 74.10 mW and 51.44 mW, respectively, giving a total energy input of 125.54 mW. With the capacity plot shown in FIG. 5C, the energy output generated by Discharging Cell was calculated to be 118.73 mW. Therefore, the energy efficiency of the system was found to be 94.6% for the first cycle. The performance of the complete system was monitored for 15 consecutive cycles as shown in FIG. 5D, and the energy input and output showed negligible changes throughout the duration of the test to give an average energy efficiency of 94.2%.

The energy efficiency demonstrated here is impressive even when the combined system is considered solely as an energy storage device. However, as the Charging Cells can simultaneously store energy and achieve desalination, the complete system reported here can achieve desalination with negligible energy consumption. The results presented in this section demonstrate the practical feasibility of dual-purpose that can achieve a maximum output voltage in aqueous media while simultaneously enabling seawater desalination with a negligible energy input.

Desalination Performance

Figure 6B:
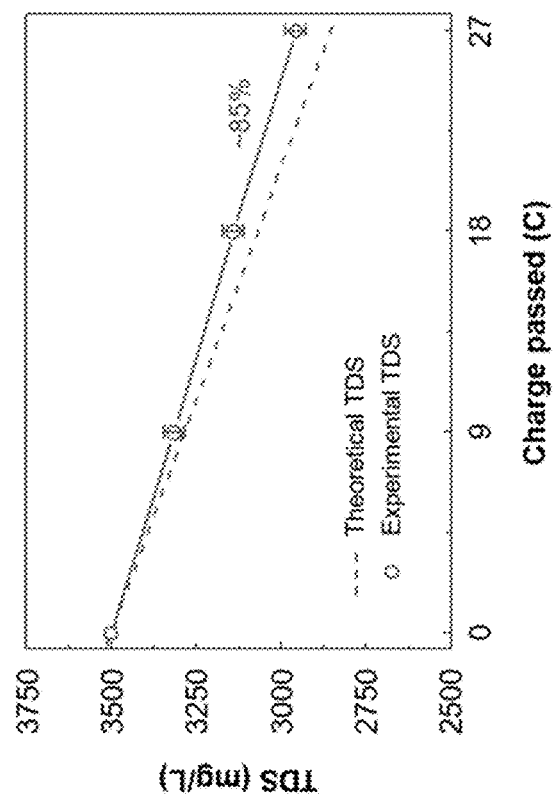
FIG. 6A shows the change in $Na^+$ and $Cl^-$ concentrations and FIG. 6B shows the change in the concentration of total dissolved solids (TDS) of the electrolyte in Charging Cell 1 ($Bi/NaTi_2(PO_4)_3$ cell) after passing a charge of 0, 9, 18 and 27 C.
Figure 6A:
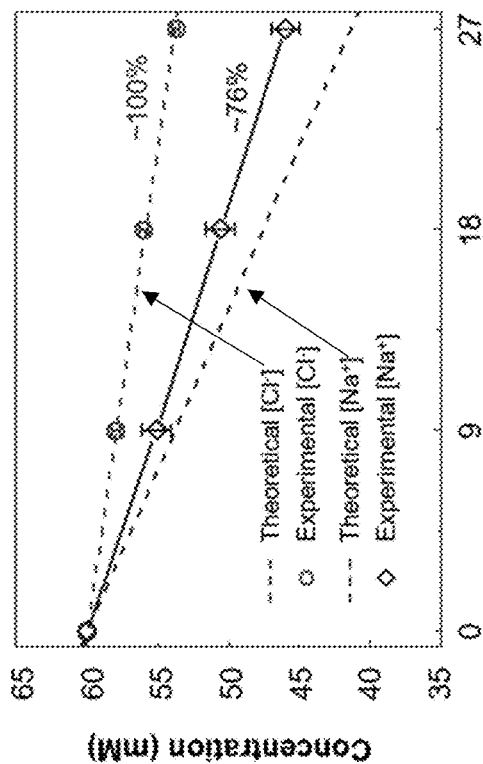

The Faradic efficiencies (FEs) for the removal of $Na^+$ and $Cl^-$ in Charging Cell 1 were evaluated by monitoring the changes in $Na^+$ and $Cl^-$ concentrations in the electrolyte during the charging process. The concentration changes of $Na^+$ and $Cl^-$ were determined using a sodium ion meter and chloride ion meter, respectively, after passing a charge of 0, 9, 18 and 27 C (FIG. 6A). The ion-selective electrodes used in the ion meters quantify the ion concentration by measuring the potential difference caused by the concentration difference. Due to the logarithmic relationship between concentration and potential from the Nernst equation, a more reliable voltage reading can be obtained when the change in ion concentration exceeds ~10% of the initial concentration. Thus, when the same amounts of $Na^+$ and $Cl^-$ are removed, a more obvious and reliable difference in the potential reading, and therefore a more accurate determination of the change in $Na^+$ and $Cl^-$ concentrations, will be obtained when the initial concentration of the solution is low. Therefore, 0.06 M NaCl was used instead of 0.6 M NaCl for this experiment.

These results show that the FE of the Bi electrode for $Cl^-$ removal was ~100% (FIG. 6A). The high FE of Bi for $Cl^-$ removal was attributed to the fact that there were no other oxidation reactions that can compete with the oxidation of Bi to BiOCl within the cell operating potential region. The FE of the $NaTi_2(PO_4)_3$ electrode for $Na^+$ removal, on the other hand, was ~76%. The low FE was likely due to the occurrence of a redox reaction between $Na_3Ti_2(PO_4)_3$ and $O_2$ dissolved in the solution. Overall, Charging Cell 1 was able to decrease the concentration of total dissolved solids (TDS) present in 0.06 M NaCl by ~15% after 27 C of charge were passed (FIG. 6B).

The $NaTi_2(PO_4)_3$/Bi cell removes $Na^+$ and $Cl^-$ with a 3:1 ratio because Bi requires $3e^-$ to remove one $Cl^-$ (Eq. 2) while $NaTi_2(PO_4)_3$ requires $1e^-$ to remove one $Na^+$ (Eq. 1). Thus, when 100% of $Na^+$ present in seawater has been removed by the desalination battery described herein, only 33% of $Cl^-$ will have been removed. The conversion of Bi to BiOCl also results in the production of protons (Eq. 2). In essence, the desalination cell described herein can convert 0.6 M NaCl to 0.4 M HCl, reducing the ion concentration by 33% with a negligible energy input. The remaining $Cl^-$ and $H^+$ can be removed by a successive electrochemical process where $Cl^-$ is converted to $Cl_2$ gas at the anode and $H^+$ is converted to $H_2$ gas at the cathode. These reactions are already used for the well-established chlor-alkali process to produce valuable $Cl_2$ and $H_2$ gases.

In the chlor-alkali process, a highly concentrated NaCl solution (e.g., 4 M NaCl) is used as the feedwater and $Cl^-$ and $H^+$ are removed in a 1:1 ratio to produce a concentrated NaOH solution. In the process described above, 0.4 M HCl will be used as the feedwater and will be converted to slightly acidic brackish water. The combination of Charging Cell 1 with subsequent conversion of the product water to mildly acidic brackish water can offer an inexpensive route to convert seawater to brackish water, which then can be converted to freshwater by reverse osmosis (RO) or electrodialysis. (RO or electrodialysis will be used to remove the remaining $Cl^-$ and other ions present in seawater). When brackish water is used as the feedwater, the energy and cost for freshwater production by RO is significantly lower than when seawater is used as the feedwater. For example, the annual electricity cost required to operate a seawater RO (SWRO) plant is more than three times higher than that required for a brackish water (BWRO) plant of the same size. Furthermore, even the construction costs of these two plants are drastically different; an SWRO plant costs more than twice as much to build as a BWRO plant of the same size. Additionally, while the desalination of seawater by electrodialysis is cost-prohibitive, desalination of brackish water by electrodialysis is cost-effective.

EXPERIMENTAL SECTION

Materials: $Bi_2O_3$ (99.999%, PURATREM), graphite (99.995%, Sigma-Aldrich), $C_{16}H_{36}O_4Ti$ (97%, Sigma-Aldrich), $H_2O_2$ (30% solution, EMD Millipore), $NH_4OH$ (28-30% $NH_3$ basis), $C_6H_8O_7$ (99.0-102.0%, Alfa Aesar), $NH_4H_2PO_4$ (≥98%, Sigma-Aldrich), $Na_2CO_3$ (Macron), $HNO_3$ (70%, Sigma-Aldrich), $NiCl_2 \cdot 6H_2O$ (98%, Alfa Aesar), $Na_3C_6H_5O_7 \cdot 2H_2O$ (≥98%, Mallinckrodt), $Na_4Fe(CN)_6 \cdot 10H_2O$ (≥99%, Sigma-Aldrich), $K_3Fe(CN)_6$ (99.7%, Fisher), polytetrafluoroethylene (PTFE) (60 wt % dispersion in $H_2O$, Sigma-Aldrich), colloidal graphite (isopropanol, Ted Pella, Inc.), NaCl (99%, Macron), $KNO_3$ (99.0%, Alfa Aesar) and EtOH (200 proof, Decon Labs Inc.) were used without further purification. Deionized water (Barnstead E-pure water purification system, resistivity >18 MΩ·cm) was used to prepare all solutions.

Synthesis of $NaTi_2(PO_4)_3$ and NiHCF: $NaTi_2(PO_4)_3$ was synthesized by a sol-gel method reported in a previous study. (D.-H. Nam et al., *J. Am. Chem. Soc.* 2017, 139, 11055.) First, 0.02 M $C_{16}H_{36}O_4Ti$ and 0.04 M $C_6H_8O_7$ were dissolved in a solution containing 280 mL $H_2O_2$ and 120 mL $NH_4OH$. Next, 0.13 M $NH_4H_2PO_4$ and 0.01 M $Na_2CO_3$ were dissolved in 80 mL DI water and 100 mL $HNO_3$, respectively. Then, the $NH_4H_2PO_4$ and $Na_2CO_3$ solutions were added into the solution containing $C_{16}H_{36}O_4Ti$ and $C_6H_8O_7$. The solution was aged at 140° C. for 2 h to obtain a yellow precipitate, and the resulting powder was annealed at 800° C. for 12 h (ramp rate=2° C. $min^{-1}$). The $NaTi_2(PO_4)_3$ powder was ground with a mortar and pestle and was annealed again at 800° C. for 12 h to improve the uniformity and crystallinity of the sample.

NiHCF was synthesized by a co-precipitation method following the procedure reported in a previous study. (M. A. Lumley, et al., *ACS Appl. Mater. Interfaces* 2020, 12, 36014.) A 150 mL solution containing 0.10 M $Na_4Fe(CN)_6$ was slowly added into a 150 mL solution containing 0.10 M $NiCl_2$ and 0.70 M $Na_3C_6H_5O_7$. The resulting solution was stirred for 5 h and was then aged at room temperature for 20 h. A pale blue precipitate formed and was centrifuged at 5000 rpm, rinsing alternately with water and ethanol. Finally, the resulting precipitate was dried at 70° C. for 24 h in a vacuum furnace held at a pressure of ~13.6 psi. The as-prepared NiHCF powder has a rhombohedral structure. EDS analysis reveals that the chemical formula of the as-prepared NiHCF powder is $Na_{1.20}Ni[Fe(CN)_6]_{0.85} \cdot nH_2O$.

Preparation of Sheet-Type Electrodes: The Bi, $NaTi_2(PO_4)_3$, and NiHCF electrodes used in this study were prepared through a ball milling process followed by a rolling-pressing procedure. The active material ($Bi_2O_3$, $NaTi_2(PO_4)_3$, or NiHCF) and graphite powder were first mixed with a mortar and pestle (the ratio of the active material to graphite powder was ~4:1 by mass), and then the mixture was ball milled for 1 h at a rate of 1060 cpm using a High-Energy Ball Mill (8000 M Mixer/Mill from SPEX SamplePrep). The resulting composite ($Bi_2O_3$/C, $NaTi_2(PO_4)_3$/C, or NiHCF/C) was mixed with a PTFE binder (ratio of ~1.6:1 by mass) using water as the solvent to form a thick slurry. The slurry was repeatedly kneaded, folded, and pressed using a mortar and pestle, followed by the use of a roll-press to form a thin sheet with desired dimensions. Finally, the electrode sheet was dried on a hot plate at 80° C. for at least 6 h to remove water and residual organic compounds. The dried electrode sheet was cut into a 1 $cm^2$ electrode and was then attached onto a graphite current collector with carbon paint to perform electrochemical tests.

Characterization: The morphology and crystal structure of the active materials were examined using a LEO 1530 Gemini Scanning Electron Microscope (SEM) at an accelerating voltage of 2 kV and powder X-ray diffractometer (XRD) (Broker D8 Advanced PXRD, Ni-filtered Cu Kα radiation, $\lambda=1.5418$ Å), respectively. Energy dispersive X-ray spectroscopy (EDS) was performed using the same SEM equipped with an EDS (Noran System Seven, Thermo Fisher) at an accelerating voltage of 12 kV. To investigate the phase change of the Bi electrode after oxidation (chlorination) and reduction (dechlorination), ex-situ XRD analysis was performed on the cycled samples.

Cyclability Tests: The cycle performances of all electrodes were examined in 0.6 M NaCl (salinity=3.5%), which mimics the salinity of seawater (~3.5%). An undivided three-electrode cell was used, and the electrolyte was not circulated or stirred during the measurements. The cycle performance of the Bi electrode was examined galvanostatically at a current density of ±4 mA $cm^{-2}$ with cutoff potentials of −1.45 V and 0.7 V vs Ag/AgCl. The Bi electrode used as the working electrode (geometric area of 1 $cm^2$) contained ~6.9 mg of Bi. Thus, 4 mA $cm^{-2}$ is equivalent to ~1.5 C-rate based on the theoretical capacity of 384.75 mAh $g^{-1}$. A NiHCF electrode (geometric area of 4 $cm^2$) was used as the counter electrode. The counter electrode had a sufficient amount of active material relative to the working electrode to ensure that the current flow was not limited by the counter electrode during the electrochemical tests. The cycle performance of the $NaTi_2(PO_4)_3$ electrode was examined galvanostatically at ±2 mA $cm^{-1}$ with cutoff potentials of −0.93 V and −0.2 V vs Ag/AgCl. The $NaTi_2(PO_4)_3$ electrode used as the working electrode (geometric area of 1 $cm^2$) contained ~10 mg of $NaTi_2(PO_4)_3$. Thus, ±2 mA $cm^{-2}$ is equivalent to ~1.5 C-rate based on the theoretical capacity of 133 mAh $g^{-1}$. A NiHCF electrode (geometric area of 4 $cm^2$) was used as the counter electrode. The cycle performance of the NiHCF electrode was examined galvanostatically at ±4 mA $cm^{-2}$ with cutoff potentials of 0.0 V and 0.9 V vs Ag/AgCl. The NiHCF electrode used as the working electrode (geometric area of 1 $cm^2$) contained ~11 mg of NiHCF. As the exact theoretical capacity of NiHCF cannot be accurately determined because of the water content that varies with temperature and humidity, 60 mA g$^{-1}$ was used as 1 C-rate in this study, which is a common assumption made in studies of PBA-based Na-storage electrodes. (C. D. Wessells, et al., *Nano Lett.* 2011, 11, 5421.) Thus, ±4 mA cm$^{-2}$ is equivalent to ~6 C-rate. A BiOCl electrode (geometric area of 4 cm$^2$) was used as the counter electrode. For all experiments, an Ag/AgCl (4 M KCl) reference electrode was placed near the working electrode to monitor the potential change of the working electrode during the cyclability tests.

Operation of Charging and Discharging Cells: The operation of Charging Cell 1 composed of a NaTi$_2$(PO$_4$)$_3$ electrode (geometric area of 4 cm$^2$) and a Bi electrode (geometric area of 1 cm$^2$) was galvanostatically tested in 0.6 M NaCl at 1.33 mA cm$^{-2}_{Bi}$ (~0.5 C-rate based on the Bi electrode) until the capacity of the Bi electrode reached 100 mAh g$^{-1}$. When the operation of Charging Cell 1 was complete, the Bi/BiOCl electrode was manually lifted from the solution, rinsed with DI water, and then moved to Charging Cell 2. In Charging Cell 2, the Bi/BiOCl electrode and a fully desodiated NiHCF electrode (geometric area of 4 cm$^2$) were electrically connected and immersed in 70 mM HCl (pH 1.3). Then, Charging Cell 2 was galvanostatically operated at 1.33 mA cm$^{-2}_{Bi}$ until the potential of the Bi/BiOCl electrode reached −0.4 V vs Ag/AgCl. When the operation of Charging Cell 2 was complete, the NiHCF electrode from Charging Cell 2 and the NaTi$_2$(PO$_4$)$_3$ electrode from Charging Cell 1 were moved to Discharging Cell. These two electrodes were electrically connected and immersed in a 0.6 M NaCl solution. Discharging Cell was operated at a constant current of 1.33 mA cm$^{-2}_{Bi}$ until the potential of the NiHCF electrode reached 0.15 V vs Ag/AgCl (4 M KCl). In all experiments, the Ag/AgCl (4 M KCl) reference electrode was placed between the working electrode and the counter electrode to monitor changes in the individual potentials of both electrodes.

Determination of Na$^+$ and Cl$^-$ Removal Efficiencies: The actual concentrations of Na$^+$ and Cl$^-$ present in the electrolyte of Charging Cell 1 were measured by a sodium ion meter (Horiba B-722) and a chloride ion meter (Horiba 6560-10C) after passing a charge of 0, 9, 18, and 27 C. An undivided three-electrode cell consisting of a Bi electrode as the working electrode, a NaTi$_2$(PO$_4$)$_3$ electrode as the counter electrode, and an Ag/AgCl electrode (4 M KCl) as the reference electrode was used for this experiment. A constant potential of 0.6 V vs. Ag/AgCl was applied to oxidize Bi to BiOCl. As the size of the Bi electrode in this experiment was limited, a 0.06 M NaCl solution was used to ensure that reliable changes in the Na$^+$ and Cl$^-$ concentrations were measured by the sodium and chloride ion meters. For the chloride ion meter whose accuracy is considerably affected by the conductivity of the sample solution, 0.1 M KNO$_3$ was added to the sample solution to provide optimum solution conductivity. The FE for ion removal was determined by dividing the measured ion concentration by the theoretically expected ion concentration based on the charge passed. The resulting value was multiplied by 100% and is reported as a percentage.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method that couples the ion extraction and recovery with energy storage and release using an aqueous electrolyte solution comprising: sodium ions or lithium ions; and chloride ions, the method comprising:
    (a) charging a first electrochemical cell comprising:
        the aqueous electrolyte solution;
        a chloride storage anode comprising a dechlorinated chloride storage material; and
        a sodium storage cathode comprising a first desodiated sodium storage material or a lithium storage cathode comprising a first delithiated lithium storage material,
        wherein the charging results in: the removal of the chloride ions and the sodium ions from the aqueous electrolyte solution or the removal of the chloride ions and the lithium ions from the aqueous electrolyte solution; the conversion of the dechlorinated chloride storage material into a chlorinated chloride storage material; and the conversion of the first desodiated sodium storage material into a first sodiated sodium storage material or the conversion of the first delithiated lithium storage material into a first lithiated lithium storage material;
    (b) charging a second electrochemical cell comprising:
        an ion-recovery electrolyte solution;
        a sodium storage anode comprising a second sodiated sodium storage material or a lithium storage anode comprising a second lithiated lithium storage material; and
        a chlorinated chloride storage cathode comprising the chlorinated chloride storage material,
        wherein the charging results in: the release of chloride ions and sodium ions into the ion-recovery electrolyte solution or the release of chloride ions and lithium ions into the ion-recovery electrolyte solution; the conversion of the chlorinated chloride storage material into the dechlorinated chloride storage material; and the conversion of the second sodiated sodium storage material into a second desodiated sodium storage material or the conversion of the second lithiated lithium storage material into a second delithiated lithium storage material; and
    (c) discharging a discharging electrochemical cell comprising:
        a discharging electrolyte solution;
        a sodium storage anode comprising the first sodiated sodium storage material or a lithium storage anode comprising the first lithiated lithium storage material; and a sodium storage cathode comprising the second desodiated sodium storage material or a lithium storage cathode comprising the second delithiated lithium storage material, wherein the discharging generates an output voltage.

2. The method of claim 1, wherein charging step (a), charging step (b), and discharging step (c) are carried out in a single electrochemical cell compartment.

3. The method of claim 1, wherein the first electrochemical cell is a desalination cell that comprises the sodium storage cathode comprising the first desodiated sodium storage material and the second electrochemical cell is a salination cell that comprises the sodium storage anode comprising the second sodiated sodium storage material.

4. The method of claim 3, wherein the aqueous electrolyte solution comprises water from a natural body of water.

5. The method of claim 4, wherein the aqueous electrolyte solution comprises seawater.

6. The method of claim 4, wherein the first desodiated sodium storage material is $NaTi_2(PO_4)_3$ and the second sodiated sodium storage material is a sodiated form of nickel hexacyanoferrate.

7. The method of claim 6, wherein the dechlorinated chloride storage material comprises bismuth.

8. The method of claim 1, wherein the first electrochemical cell is a dilithiation cell that comprises the lithium storage cathode comprising the first delithiated lithium storage material and the second electrochemical cell is a lithiation cell that comprises the lithium storage anode comprising the second lithiated lithium storage material.

9. The method of claim 8, wherein the first aqueous electrolyte solution comprises water from a geothermal brine.

* * * * *

UNITED STATES PATENT AND TRADEMARK OFFICE
CERTIFICATE OF CORRECTION

Page 1 of 1

PATENT NO.         : 11,757,140 B2
APPLICATION NO.    : 17/165081
DATED              : September 12, 2023
INVENTOR(S)        : Kyoung-Shin Choi et al.

It is certified that error appears in the above-identified patent and that said Letters Patent is hereby corrected as shown below:

In the Specification

Column 5, Line 4:
Delete the phrase "Cl-storage electrode + $Cl^-$ [Cl-storage electrode]$^+$:$Cl^-$ + $e^-$" and replace with --Cl-storage electrode + $Cl^- \rightarrow$ [Cl-storage electrode]$^+$:$Cl^-$ + $e^-$--.

Column 10, Line 31:
Delete the phrase "$2 \leq x \leq 2$)" and replace with --$1 \leq x \leq 2$)--.

Column 13, Line 10:
Delete the phrase "where Et can serve" and replace with --where $H^+$ can serve--.

Column 14, Lines 19-20:
Delete the phrase "dual-purpose that" and replace with --dual-purpose ARNBs that--.

In the Claims

Claim 1, Column 18, Line 17:
Delete the phrase "couples the i on extraction" and replace with --couples ion extraction--.

Signed and Sealed this
Thirty-first Day of October, 2023

Katherine Kelly Vidal
*Director of the United States Patent and Trademark Office*